(12) United States Patent
Vrbanac et al.

(10) Patent No.: US 6,769,199 B2
(45) Date of Patent: Aug. 3, 2004

(54) PROCESS FOR PRODUCING DRIED SINGULATED CELLULOSE PULP FIBERS USING A JET DRIER AND INJECTED STEAM AND THE PRODUCT RESULTING THEREFROM

(75) Inventors: Michael David Vrbanac, Normandy Park, WA (US); Ramon Charles Dezutter, Milton, WA (US); Brian Wester, Sumner, WA (US); Michael James Yancey, Puyallup, WA (US)

(73) Assignee: Weyerhaeuser Company, Federal Way, WA (US)

( * ) Notice: Subject to any disclaimer, the term of this patent is extended or adjusted under 35 U.S.C. 154(b) by 9 days.

(21) Appl. No.: 10/187,213

(22) Filed: Jun. 28, 2002

(65) Prior Publication Data

US 2003/0093916 A1 May 22, 2003

Related U.S. Application Data

(63) Continuation-in-part of application No. 10/051,392, filed on Jan. 16, 2002, which is a continuation-in-part of application No. 09/998,143, filed on Oct. 30, 2001.

(51) Int. Cl.$^7$ .................................................. F26B 3/08
(52) U.S. Cl. .............................. 34/359; 34/83; 34/443; 162/9; 162/55; 162/63
(58) Field of Search ........................... 34/326, 221, 83, 34/359, 413, 443; 604/374, 367; 162/9, 55, 65, 63

(56) References Cited

U.S. PATENT DOCUMENTS

| | | |
|---|---|---|
| 2,991,946 A | 7/1961 | Croft |
| 3,268,954 A | 8/1966 | Joa |
| 3,415,456 A | 12/1968 | Bidwell |
| 3,440,135 A * | 4/1969 | Chung ...................... 162/157 |
| 3,491,953 A | 1/1970 | Stephanoff |
| 3,543,351 A | 12/1970 | George |
| 3,554,862 A | 1/1971 | Hervey et al. |
| 3,554,863 A | 1/1971 | Hervey et al. |

(List continued on next page.)

FOREIGN PATENT DOCUMENTS

| | | |
|---|---|---|
| CA | 947915 | 5/1974 |
| CA | 993618 | 7/1976 |
| CA | 1017519 | 9/1977 |
| CA | 1124451 | 6/1982 |

(List continued on next page.)

OTHER PUBLICATIONS

Bentley, S., "An Apparatus for Producing Air–Formed Handsheets," *Pulp and Paper Research Institute of Canada*, pp. A11–A17.

Larsson, O. and B. Lindström, "Recent Developments in Pulp Drying," *World Pulp and Paper Week*, Stockholm, Jun. 4–7, 1996, pp. 875–884.

Sarigaphuti, M., et al., "Shrinkage Cracking and Durability Characteristics of Cellulose Fiber Reinforced Concrete," *ACI Materials Journal* 90(4):309–318, Jul.–Aug. 1993.

*Primary Examiner*—Camtu T. Nguyen
(74) *Attorney, Agent, or Firm*—Christensen O'Connor Johnson Kindness PLLC

(57) ABSTRACT

This invention provides a dried singulated cellulose pulp fiber product as well as an apparatus and a method for forming singulated and dried fibers. In accordance with the process a feed pulp is delivered to a jet drier. The jet drier singulates and dries the feed pulp. The singulated and dried fibers are collected from the jet drier. The feed pulp may be treated with a treatment substance. The jet drier may be maintained at negative pressure. The product fibers may have low knot count, a low fines count, as well improved kink, curl and twist. The apparatus for carrying out the process may include a pretreatment station for supplying the treatment substance, a pulp feed device designed for pulp, a pulp feed device designed for pulp and foam suspensions, and/or a fiber separation station having a vacuum conveyor.

10 Claims, 8 Drawing Sheets

U.S. PATENT DOCUMENTS

| | | | |
|---|---|---|---|
| 3,667,131 A | | 6/1972 | Stephanoff |
| 3,802,089 A | | 4/1974 | Stephanoff |
| 3,898,157 A | | 8/1975 | Hooper |
| 3,906,064 A | * | 9/1975 | Iannazzi et al. ............... 264/24 |
| 3,945,130 A | | 3/1976 | Stephanoff |
| 3,974,574 A | | 8/1976 | Van Vliet et al. |
| 3,977,089 A | | 8/1976 | Forster et al. |
| 3,987,968 A | | 10/1976 | Moore et al. |
| 4,033,853 A | | 7/1977 | Hann |
| 4,036,679 A | | 7/1977 | Back et al. |
| 4,043,049 A | | 8/1977 | Hedstrom |
| 4,065,347 A | | 12/1977 | Åberg et al. |
| 4,098,006 A | | 7/1978 | Maffet |
| 4,099,336 A | | 7/1978 | Maffet |
| 4,110,195 A | | 8/1978 | Harding |
| 4,113,936 A | * | 9/1978 | Lesas et al. .................. 536/56 |
| 4,121,349 A | | 10/1978 | Maffet |
| 4,128,946 A | | 12/1978 | Maffet |
| 4,161,825 A | | 7/1979 | Maffet |
| 4,183,146 A | | 1/1980 | Tsukamoto et al. |
| 4,198,004 A | | 4/1980 | Albus et al. |
| 4,204,055 A | | 5/1980 | Lesas et al. |
| 4,214,375 A | | 7/1980 | Albus et al. |
| 4,226,027 A | | 10/1980 | Albus |
| 4,253,822 A | * | 3/1981 | Marsh ......................... 432/14 |
| 4,259,958 A | | 4/1981 | Goodbar |
| 4,347,128 A | | 8/1982 | Barnscheidt |
| 4,489,503 A | | 12/1984 | Browne et al. |
| 4,506,834 A | | 3/1985 | Ek |
| 4,528,995 A | | 7/1985 | Korte et al. |
| 4,537,655 A | | 8/1985 | Henriksson et al. |
| 4,547,263 A | | 10/1985 | Quame |
| 4,557,800 A | | 12/1985 | Kinsley, Jr. |
| 4,594,793 A | | 6/1986 | Carlson |
| 4,613,627 A | | 9/1986 | Sherman et al. |
| 4,650,127 A | | 3/1987 | Radwanski et al. |
| 4,668,339 A | | 5/1987 | Terry |
| 4,671,860 A | | 6/1987 | Huddleston, Jr. et al. |
| 4,701,857 A | * | 10/1987 | Robinson .................... 364/477 |
| 4,718,178 A | * | 1/1988 | Whipple ..................... 34/156 |
| 4,799,961 A | * | 1/1989 | Friberg ........................ 106/93 |
| 4,919,340 A | | 4/1990 | Gerber |
| 5,007,181 A | | 4/1991 | Jackson et al. |
| 5,176,793 A | | 1/1993 | Kurtz |
| 5,181,987 A | | 1/1993 | Breuker et al. |
| 5,188,298 A | | 2/1993 | Gerber |
| 5,225,047 A | | 7/1993 | Graef et al. |
| 5,252,275 A | | 10/1993 | Sultze et al. |
| 5,266,211 A | | 11/1993 | Breuker et al. |
| 5,279,046 A | | 1/1994 | Vincent |
| 5,384,012 A | | 1/1995 | Hazard, Jr. |
| 5,437,418 A | | 8/1995 | Graef et al. |
| 5,527,432 A | | 6/1996 | Leuthold et al. |
| 5,556,976 A | | 9/1996 | Jewell |
| 5,564,635 A | | 10/1996 | Terada et al. |
| 5,634,281 A | | 6/1997 | Nugent |
| 5,643,359 A | | 7/1997 | Soroushian et al. |
| 5,709,774 A | | 1/1998 | Naieni |
| 5,722,603 A | | 3/1998 | Costello et al. |
| 5,800,418 A | | 9/1998 | Ahr |
| 5,816,507 A | | 10/1998 | Skali Lami et al. |
| 5,873,979 A | | 2/1999 | Naieni |
| 5,913,588 A | | 6/1999 | Legros et al. |
| 5,989,335 A | | 11/1999 | Soroushian et al. |
| 6,074,524 A | | 6/2000 | Wu et al. |
| 6,159,335 A | | 12/2000 | Owens et al. |
| 6,171,443 B1 | | 1/2001 | Goettmann et al. |
| 6,184,271 B1 | | 2/2001 | Westland et al. |
| 6,296,736 B1 | | 10/2001 | Hsu et al. |
| 6,296,737 B1 | | 10/2001 | Wu et al. |
| 6,383,336 B1 | | 5/2002 | Shannon |
| 6,436,231 B1 | | 8/2002 | Graef et al. |
| 6,471,825 B1 | * | 10/2002 | Doelle et al. .................. 162/9 |

FOREIGN PATENT DOCUMENTS

| | | |
|---|---|---|
| DE | 509541 | 9/1930 |
| DE | 30 03 971 A1 | 8/1980 |
| EP | 0 773 768 B1 | 1/2000 |
| EP | 0 845 966 B1 | 3/2000 |
| GB | 1 405 079 | 9/1975 |
| WO | WO 94/10953 A1 | 5/1994 |
| WO | WO 97/25575 | 7/1997 |

* cited by examiner

PROCESS FOR PRODUCING DRIED SINGULATED CELLULOSE PULP FIBERS USING A JET DRIER AND INJECTED STEAM AND THE PRODUCT RESULTING THEREFROM

CROSS-REFERENCE TO RELATED APPLICATIONS

This application is a continuation-in-part of prior Application Ser. No. 10/051,392 filed Jan. 16, 2002, which is a continuation-in-part of prior application Ser. No. 09/998,143 filed Oct. 30, 2001. The benefit of the filing dates of the previous applications are claimed under 35 U.S.C. §120.

FIELD OF THE INVENTION

The present invention relates to a dried singulated cellulose pulp fiber product as well as a process for producing dried singulated cellulose pulp fibers, and more particularly, a process for producing dried singulated cellulose pulp fibers using a jet drier.

BACKGROUND OF THE INVENTION

Dried singulated cellulose pulp fibers are desirable for many products from absorbent personal articles to a strengthener in concrete. Currently, in the most common process of making singulated fibers, a roll of conventional pulp fibers is hammermilled into singulated fibers. This process is energy and time intensive, requiring many steps and pieces of processing equipment. Each piece of processing equipment requires a significant capital expenditure and occupies valuable factory floor space. Further, the current hammermilling process often produces fibers with undesirable physical properties, such as low kink, curl, and twist.

This dry singulated pulp will also contain knots of fiber, sometimes referred to as nits or nodules. Knots are fiber clumps that remain strongly adhered to one another as can be seen by placing a small portion of pulp into a clear beaker of water and stirring the water to mix the fibers. Most of the fiber will mix into the water as singular fibers, however there will be fiber clumps that are readily visible. The fiber clumps or knots are undesirable by-products of the hammermilling process. The amount of knots in a pulp that has been hammermilled can be quantified by using a screening system with acoustical energy used as the means to classify the fiber into sizes of knots, accepts and fines. It is desirable to have low knots and fines and high accepts where the accepts are the singulated fibers.

Canadian Patent No. 993618 (Estes, 1976) describes a process for producing a low density fluff pad or batt from individual fibers that have significant kink and interlocking to provide improved batt strength and higher bulk. In accordance with the process, wet pulp is separated into individual fibers during the drying stage. The process uses fluid jet drying equipment that employ air-jets or steam-jets for separating the fibers. The fibers are laid on a perforated screen upon exiting from the jet drier. The fibers produced by the process of the Canadian patent, however, have a very high knot content, which as stated above is an undesirable characteristic.

SUMMARY OF THE INVENTION

This invention provides a dried singulated cellulose pulp fiber product as well as a method for forming singulated and dried fibers that have a relatively low knot content. In accordance with the process, wet pulp, steam, and air are introduced into a jet drier. The pulp is dried in the jet drier to form singulated pulp fibers. The pulp is removed from the jet drier and separated from the air. The process may be used on several types of feed pulp and on treated feed pulp. The product formed by the process has advantageous properties such as a low knot count, a low fines count, as well as improved kink, curl and twist.

A drying system for the processing of pulp into singulated and dried fibers includes a jet drier, a pulp supply station, an air supply station, an outlet flow conduit and a fiber separation station. The jet drier has a jet conduit, a manifold for air intake into the jet conduit, a steam injection port, a pulp intake for delivery of pulp into the jet conduit, and a fiber outlet for removal of singulated and dried fibers, outlet air and fines from the jet conduit. The pulp supply station is coupled to the pulp intake for supplying a feed pulp to the pulp intake. The air supply station is coupled to the manifold for delivering air to the manifold. Steam is supplied under pressure to the steam injection port. The outlet flow conduit is coupled to the fiber outlet for the transport of the fibers, outlet air and fines from the jet conduit. The fiber separation station is coupled to the outlet flow conduit for separating the fibers from the outlet air.

The present invention thus provides a dried singulated cellulose pulp fiber product as well as a method that enable forming singulated and dried fibers having a low knot content. The process may take wet pulp directly from a pulp mill and produce a singulated product from never-dried or once-dried pulp. Using steam in the process forms fibers with greater kink, curl, and twist than hammermilled fibers. A further advantage of using steam is the ability to produce fibers having a low knot and fines content. The addition of steam during the jet drying process results in a more stable outlet temperature. The fiber mat produced also appears to be more uniform. Product moisture, however, preferably is still within acceptable range of less than 6% to 10%. In addition, a measurable reduction in sonic knots was achieved relative to conventional untreated fiber dried using the jet drier alone.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides for processes and apparatus for the drying, treatment, and singulation of pulp into individual fibers with few knots or nodules. As used herein the term "dried" in regards to fibers, is a term of art generally indicating a weight percentage of water between 2% and 10%, but may fall above or below this range. As used herein the term "air" is not limited to pure air but may include any gas consistent with the present invention. As used herein the term "consistency" means the percentage of solids content of a liquid and solid mixture. The specific examples set forth below are directed to the drying, treatment, and singulation of cellulose pulp fibers. However, it should be understood that the present invention is also suitable for use in processing other types of natural fibers and/or synthetic fibers.

Figure 1:
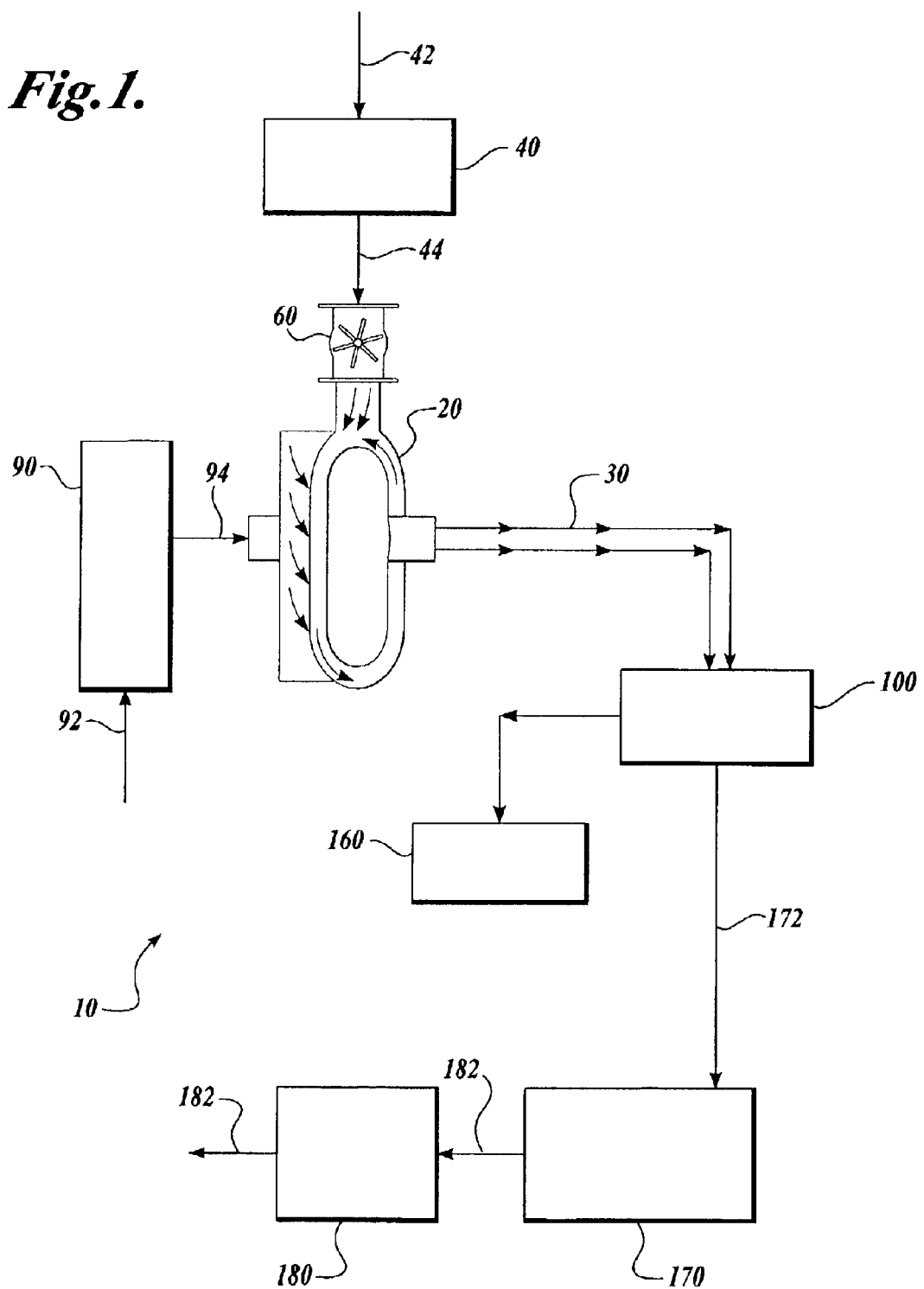
FIG. 1 is a schematic diagram of a drying system constructed in accordance with the present invention suitable for carrying out the process in the present invention.

The present invention comprises a drying system having a jet drier designed to dry wet pulp directly from a pulp mill to a singulated fiber product. Referring to FIG. 1, a drying system 10 constructed in accordance with the present invention includes a jet drier 20, a pulp supply station 40, an air supply station 90, a fiber separation station 100, and a fiber collection station 160.

The pulp supply station 40 is coupled in flow communication with the jet drier 20. The pulp supply station 40 receives supply pulp from a pulp supply source 42 and provides a feed pulp to the jet drier 20 via a pulp feed conduit 44. The air supply station 90 is coupled in flow communication with the jet drier 20. The air supply station 90 receives supply air from an air supply source 92 and provides feed air via an air feed conduit 94 to the jet drier 20. The jet drier 20 is coupled in flow communication with the fiber separation station 100 via outlet flow conduit 30. The jet drier 20 exhausts outlet air, substantially dried and singulated fibers, and fines to the fiber separation station 100 via outlet flow conduit 30. The fiber separation station 100 is coupled in flow communication with the fiber collection station 160. The fiber separation station 100 separates the outlet air from the fibers, and may also separate a portion of the fines from the fibers. The fibers from the fiber separation station 100 are delivered to the fiber collection station 160.

In a preferred embodiment, the apparatus also includes a fines removal station 170 and a noise reduction station 180. The fiber separation station 100 is coupled in flow communication with the fines removal station 170 through fines conduit 172. The fiber separation station 100 provides outlet air and fines to the fines removal station 170 via fines conduit 172. The fines removal station 170 removes the fines from the outlet air and recycles the outlet air back to the air supply station 90 via air conduit 182. The noise reduction station 180 is preferably interposed in air conduit 182 to reduce the noise produced by the drying system 10.

Figure 2:
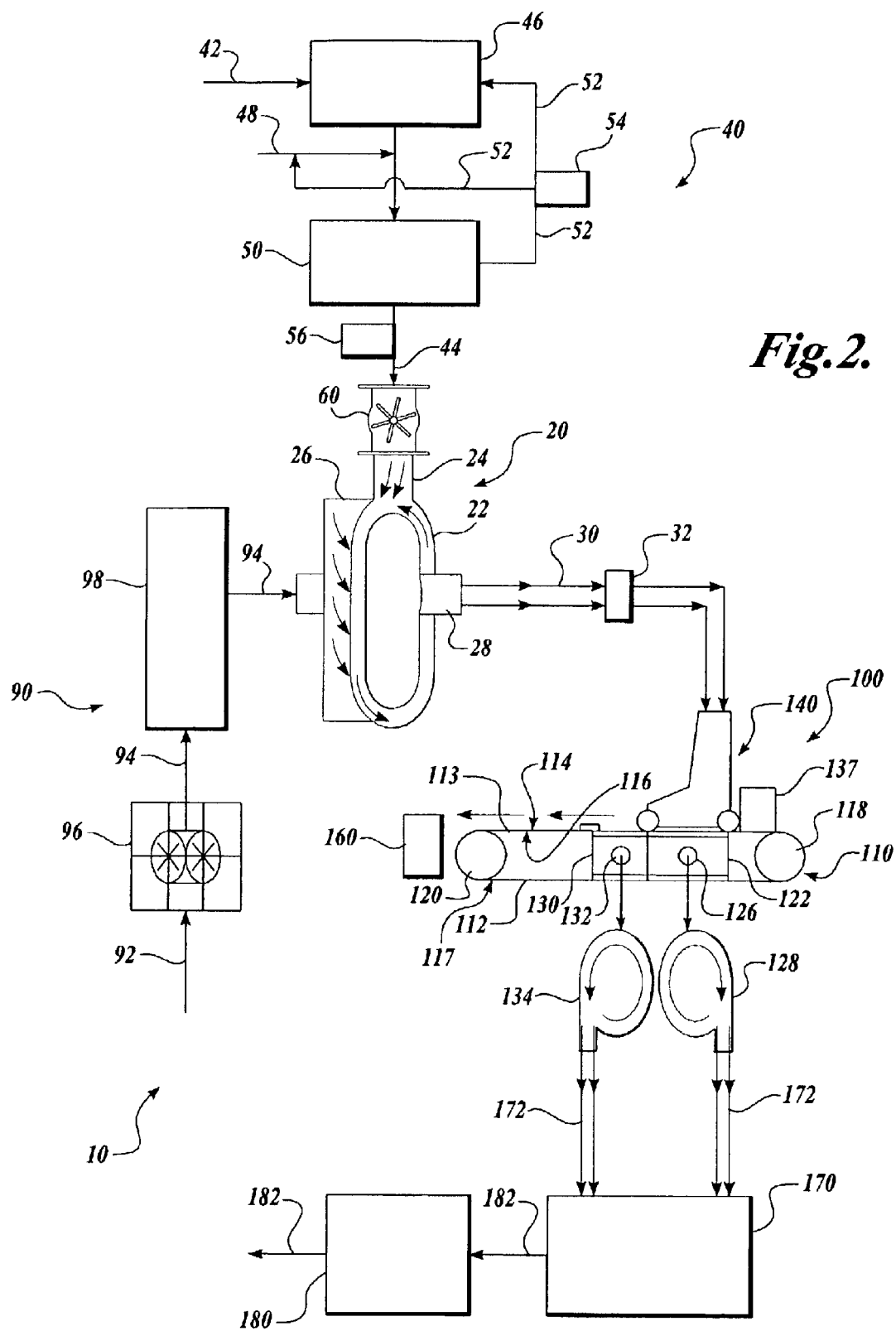
FIG. 2 is a schematic view of the drying system of the present invention with a cross section view of a jet drier and a fiber separation station.

Referring to FIG. 2, the jet drier 20 includes a loop conduit 22, a pulp intake 24, a manifold 26, and a fiber outlet 28. It will be understood that, as used herein, the term "jet drier" means any device which accelerates air into the loop conduit 22, enabling the simultaneous drying and singulation of a substance flowing though the conduit 22. The pulp intake 24 is coupled to the conduit 22 for delivering feed pulp to the conduit 22. The manifold 26 is coupled to the jet drier conduit 22 to deliver feed air via air feed conduit 94 into the conduit 22 through a series of nozzles which are directed to induce a flow within the conduit 22. The fiber outlet 28 is coupled to the conduit 22 to supply an outlet for outlet air, fibers, and fines flow out of conduit 22.

The conduit 22 is preferably arranged in a closed loop. The conduit 22 loop can take various shapes such as circular, elongated rectangular, a "D" shape, square, or other similar shape. Without being bound by theory, it is believed that when wet fibers enter the conduit 22 loop, a centrifugal separation takes place so that wetter/denser fibers are recirculated along the outer edge of the loop while drier/less-dense fibers move towards the inner part of the loop. Air and dried product exit from a fiber outlet 28 placed along the inner part of the loop. One suitable jet drier 20 for use in the present invention is a Fluid Energy A1jet Model 4 Thermajet, X0870L, manufactured by Fluid Energy Processing & Equipment Company. Alternatively, the jet drier conduit 22 may be in a shape other than a closed loop. For example, the conduit 22 could be straight. In this embodiment, the fibers may be recovered at the end of the conduit 22.

The drying system 20 further includes an outlet flow conduit 30 coupled to the jet drier 20 fiber outlet 28 and associated with the fiber separating station 100. The outlet flow conduit 30 delivers outlet air, fibers, and fines flow to the fiber separating station 100. The outlet flow conduit may include a first material handling fan 32. The first material handling fan 32 prevents the fibers and fines from settling out of the outlet air if the outlet air slows in the conduit 30. However, the first material handling fan 32 may not be necessary if the outlet flow conduit is of a length which minimizes the effects of drag on the velocity of the outlet air, and/or if the outlet flow conduit is of substantially similar diameter to the fiber outlet 28 of the jet drier 20. The first material handling fan 32 may have an adverse impact on the physical properties of fibers, and so may be excluded from the drying system 10. It is desirable to prevent the fibers and fines from settling out of the outlet air. If fibers and fines settle out of the outlet air, the fibers have an increased tendency to knot.

The pulp supply station 40 may include a first dewatering device 46. The first dewatering device 46 is connected in flow communication with pulp supply 42 and pulp feed conduit 44. The pulp supply source 42 delivers supply pulp directly from the pulping stage of a pulp mill to the first dewatering device 46. The first dewatering device 46 partially dewaters the supply pulp from pulp supply 42 and delivers feed pulp via pulp feed conduit 44 to jet drier 20. The first dewatering device 46 includes, but is not limited to, devices such as a screw press, belt press, continuous centrifuge, batch centrifuge, double roll press, or other similar device.

The supply pulp from pulp supply source 42 will typically have a high fluid content, having a 0.01–10% consistency, and more typically a 3–10% consistency. The supply pulp may be bleached pulp, unbleached pulp, mechanical pulp, chemical pulp, a dissolving grade pulp, once dried and reslurried pulp, or any other suitable pulp. In the present invention, much of this fluid may be removed by the first dewatering device 46. Typically, the first dewatering device 46 removes a portion of the fluid from the supply pulp and increases the consistency of the feed pulp to 10–55%, prior to drying the feed pulp by the jet drier 20. Preferably the consistency of the feed pulp is 30 to 50%. The partially dewatered feed pulp is transported to the jet drier 20 via pulp feed conduit 44.

The supply pulp may be a pressed wet web of pulp having a basis weight of a substantial amount to provide sufficient stiffness to feed the web into a shredding device. The basis weight may typically be from 500 to 1500 gsm. The wet web supply pulp may be fed into a shredding device such as a rapidly rotating set of rolls containing protruding pins that tear the web into small pieces of pulp, a material handling fan, or other similar device.

The pulp feed conduit 44 may be a pipe, hopper, or other conveyance device. Additionally, the first dewatering device 46 itself may serve as a conveyance device. For example, the first dewatering device 46 may be a screw press which could be used to simultaneously dewater and transport the feed pulp to the jet drier 20. One suitable pulp supply station 40 pulp feed conduit 44 for use in the present invention is a shaftless screw conveyor designed and manufactured by Martin Sprocet and Grear, Inc., Martin Conveyor Division. The shaftless screw conveyor has a shaftless screw which feeds wet pulp at an incline that rises up toward the pulp intake 24 of the jet drier 20. The shaftless screw conveyor has a hopper at the lower end of the conveyer for placing supply pulp.

The pulp supply station 40 may include a treatment supply source 48 for incorporating a treatment substance into the feed pulp. The treatment supply source 48 may be coupled in flow communication to the pulp supply source 42, the pulp feed conduit 44, the first dewatering station 46, or anywhere along the pulp supply station 40.

The treatment supply source 48 may deliver the treatment substance with any apparatus known in the art. For instance, treatment supply source 48 may deliver the treatment substance with a conduit, spray system, mixing device, or other device or combination of devices. Where the supply pulp is a pressed wet web of pulp, the treatment substance may be applied to the supply pulp by a spray system, roller coating system, or a combination of spray system and roller coating system.

Many treatment substances that may be applied to the feed pulp prior to being dried and singulated by the jet drier 20, are incapable of being incorporated into the traditional process of producing dried singulated fibers. The traditional process is limited in its ability to treat the fibers since they are in a web form. In this web form, treatment of the fibers must be done by running the web through a bath or spraying the web. The present invention is not limited in this way, since treatment substances may be directly delivered to the pulp. For example, the fibers of the supply pulp in the present invention may be suspended within a foam prior to drying by the jet drier 20 or viscous solutions may be mixed with the supply pulp. Neither one of these treatment choices would be practical with the traditional bath treatment step. The application of treatment substances that are viscous solutions cannot be accomplished with a traditional pulp machine. Additionally, the harsh conditions of hammermilling limit the practicality of the fibers retaining certain compounds that may be used as treatment substances. For example, coating the fibers with mineral particulate, such as clay, would result in low clay retention with hammermilling, but in the present invention retention may be significantly higher due to the singulation being accomplished by air rather than mechanical means. Further, the amount of surfactant used to treat pulp on a traditional pulp machine is limited due to the adverse affect on operations, however, there is no such limitation with the present invention. In traditional pulp machines, the surfactant decreases the strength of the pulp web. If enough strength is lost, the pulp web can no longer be threaded through the traditional pulp machines.

The treatment substance delivered by treatment supply source 48 may include, but is not limited to, surfactants, crosslinkers, hydrophobic materials, mineral particulates, superplasticizer, foams, other materials for specific end-use fiber properties, and combinations of treatment substances. The term surfactant includes, but is not limited to oil in water emulsions; surfactants disclosed in U.S. application Ser. No. 08/509,401 to Graef et al.; U.S. Pat. No. 3,554,863 to Hervey et al.; U.S. Pat. No. 6,074,524 to Wu et al.; U.S. Pat. No. 6,159,335 to Owens et al.; and Canadian Pat. No. 947915 to Angel et al.; all of which are expressly incorporated herein by reference. Surfactants impart desirable properties to pulp fibers such as reducing fiber to fiber bonding, improving absorbency or reducing friction of finished webs. Surfactants are used in tissue and towel manufacturing, and are used extensively in the textile industry for numerous enhancements. The classes of surfactants include anionic, cationic, nonionic, or ampholytic/zwitterionic surface active materials. Examples of anionic surfactants include sodium stearate, sodium oleate, sodium dodecyl sulfate, sodium dodecyl benzene sulfonate, polyether sulfate, phosphate, polyether ester and sulfosuccinate. Examples of cationic surfactants include dodecylamine hydrochloride, hexadecyltrimethyl ammonium bromide, cetyltrimethyl-ammonium bromide, and cetylpyridinium bromide. One class of surfactant is cationic surfactants based on quaternary ammonium compounds containing fatty type groups. Examples of nonionic surfactants include polyethylene oxides, sorbitan esters, polyoxyethylene sorbitan esters, and alkylaryl polyether alcohols. An example of ampholytic or zwitterionic surfactant is dodecyl betaine. Examples of commercial surfactant are EKA Chemicals Inc. Berolcell 587K which is a cationic surface active agent and Process Chemicals, LLC Softener CWW which is a cationic surfactant used as a yarn lubricant.

The term crosslinker includes, but is not limited to, polyacrylic acid; glyoxol; crosslinkers disclosed in U.S. application Ser. No. 08/509,401 to Graef et al.; and U.S. app. Ser. No. 60/251,999 to Graef et al.; all of which are expressly incorporated herein by reference. The term hydrophobic material includes, but is not limited to, latex, sizing agents used to treat pulp such as alkyl ketene dimer or alkenyl succinic anhydride, waxes, oils, or other chemicals that react with the fiber and render the surface hydrophobic. The term mineral particulate includes, but is not limited to, clay, calcinated clay, calcium carbonate, calcium sulfate, zinc oxide, talc, titanium dioxide, silicas, fly ash, sodium aluminosilicates, or other minerals. The term superplasticizer includes, but is not limited to, linear polymers that contain sulfonic acid groups, modified lignosulfonates, sulfonated melamine-formaldehyde condensates, sulfonated naphthalene-formaldehyde condensates, and polycarboxylate derivatives. An example of a commercial superplasticizers include Boral Materials Technology Boral SP, a sulfonated naphthalene-formaldehyde condensate. The term foam includes, but is not limited to, foaming agents, foamed material, and foams disclosed in U.S. application Ser. No. 09/569,380 to Graef et al., which are expressly incorporated herein by reference.

The treatment supply source 48 may also deliver more than one treatment substance, and may deliver treatment substances in any number of steps or stages. For instance, the treatment substance may include binder molecules and particles, where the binder molecules are first applied to the fibers and then the particles are added to the binder molecule coated fibers thus binding the particles to the fibers (as disclosed in U.S. Pat. No. 5,641,561 to Hansen et al., which is expressly incorporated herein by reference). Other fiber treatment substances and methods known in the art may be used without departing from the present invention.

In addition to the embodiment described above, the pulp supply station 40 may be adapted so that the water contained in the pulp supply source 42 is exchanged for a solvent treatment substance. The term solvent includes, but is not limited to, alcohols, ketones, ethers, alkanes, aromatics, aldehydes, or other classes of organic materials. The solvent used may be recovered at the fiber separation station 100

Additional treatment substances may be added to cause an in situ precipitation. When in situ precipitation is desirable, a first mineral treatment substance is added to the pulp, then a second treatment substance is added to the pulp. The first and second treatment substances react to form a precipitate treatment substance. For example, dissolved calcium hydroxide may be used as the first treatment substance and dissolved sodium bicarbonate may be used as the second treatment substance. The calcium hydroxide and sodium bicarbonate react to precipitate calcium carbonate. Other precipitate treatment substances may be formed for treating the pulp including, but is not limited to, calcium aluminum silicates, calcium aluminum carbonates, calcium aluminum phosphates, or other mineral precipitates.

The pulp supply station 40 may include a second dewatering device 50. The second dewatering device 50 is inserted in pulp feed conduit 44 to be in flow communication with the first dewatering device 46. The second dewatering device 50 may include, but is not limited to, devices such as a screw press, belt press, continuous centrifuge, batch centrifuge, double roll press, or other similar device. Like the first dewatering device 46, the second dewatering device 50 removes a portion of the fluid so the feed pulp has a consistency of 10–55%, preferably 30–50%, prior to drying the feed pulp by the jet drier 20. The partially dewatered feed pulp is then transported to the jet drier 20 by pulp feed conduit 44. Alternatively, the second dewatering device 50 itself may serve as a conveyance device. For example, a screw press could be used to simultaneously dewater and transport the feed pulp to the jet drier 20.

The second dewatering device 50 further dewaters the treated feed pulp, potentially removing a portion of the treatment substance from the pulp. To recover a portion of the separated treatment substance, a treatment recycle conduit 52 may be connected in flow communication between the second dewatering device 50 first dewatering device 46 and/or the treatment supply source 48. The incorporation of treatment substance with the pulp may be accomplished through the agitation supplied by the first and/or second dewatering devices 46 and 50.

Alternatively, the pulp supply station 40 may include a holding tank device 54. The holding tank device 54 may be inserted in recycle conduit 52 to be in flow communication with the second dewatering device 50. The holding tank device 54 acts as a reservoir to store separated treatment substance from the second dewatering device 50 and disperse the stored separated treatment substance to the first dewatering device 46 and/or to the treatment supply source 48.

The pulp supply station 40 may include a second material handling fan 56 inserted in flow communication into pulp feed conduit 44. After dewatering, the feed pulp may be run through the second material handling fan 56 to break apart the larger pieces of feed pulp into pieces of less than 2 inches in nominal diameter, prior to introduction into the jet drier 20. The second material handling fan 56 may be any de-flaking device, including but not limited to, a buster fan, a pin fluffer, a material handling fan, or a shredder.

The pulp supply station 40 further includes a pulp feed device 60 coupled in flow communication with pulp feed conduit 44 and jet drier 20 pulp intake 24. The pulp feed device 60 is a wet pulp delivery apparatus that can produce a regulated continuously consistent supply of feed pulp at a desired feed rate to the pulp intake 24 of the jet drier 20. The feed pulp has been previously dewatered and in some cases treated. The feed rate of feed pulp is a process variable that has a direct affect on process air temperature, process air pressure, end product fiber appearance, and end product fiber knot count. The pulp feed device 60 is a device that separates atmospheric air from an environment of a higher or lower pressure inside the jet drier 20, and/or separates ambient temperatures from an environment of higher temperatures inside the jet drier 20. The pulp feed device 60 allows a continuous input of feed pulp to pass through to the jet drier 20 with a minimum flow of atmospheric air entering the jet drier 20.

Figure 3:
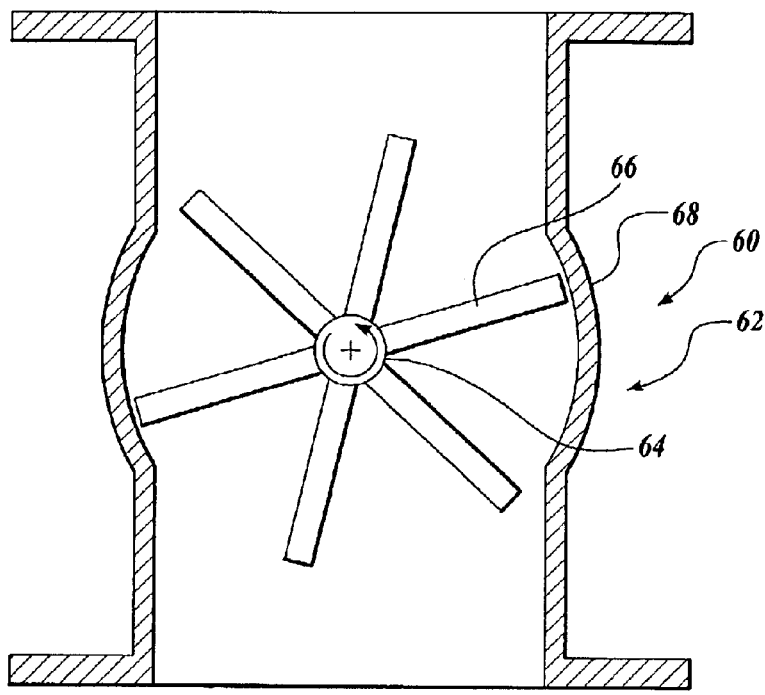
FIG. 3 is a cross section view of a pulp feed device of the present invention.
Figure 4:
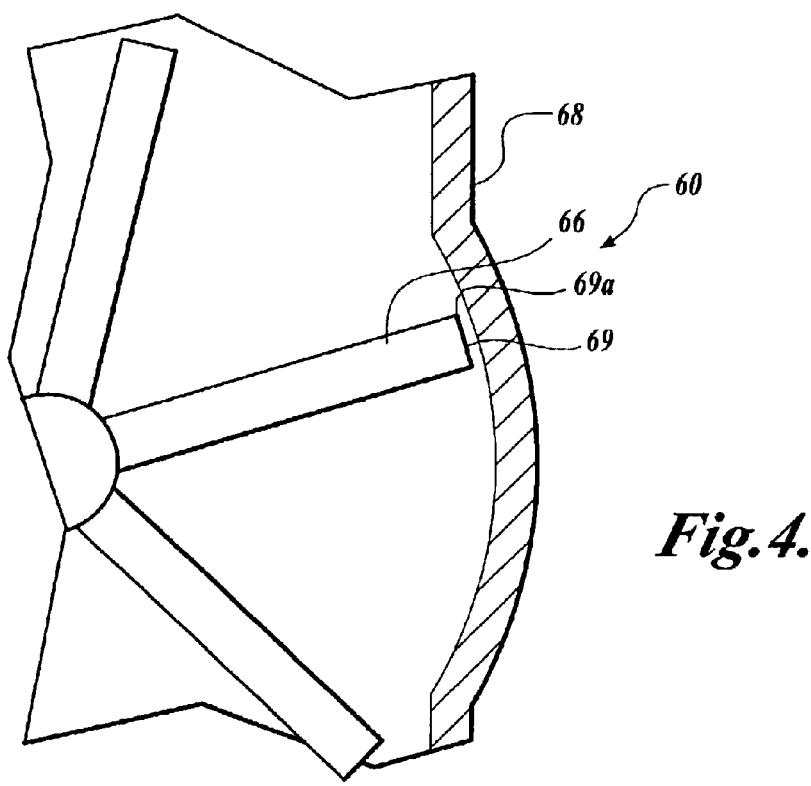
FIG. 4 is an enlarged cross section view of the pulp feed device rotor of the present invention.

Referring to FIG. 3, the pulp feed device 60 may be a rotary air lock 62 having a rotor 64 with rotor vanes 66 rotatably mounted within a rotor housing 68. One suitable rotary air lock 62 for use in the present invention is a modified stainless steel Prater Industries Rotary Air Lock Feeder model number PAV-6C having a rotor housing, and a CLSD,SS,PAV-6 rotor with six rotor vanes. Referring to FIG. 4, the Prater Industries rotor vanes were supplied from the manufacturer with a standard clearance 69 between the leading edge of each vane and the rotor housing 68 of less than 0.010 inches. The rotor with a standard clearance between rotor vanes 66 and housing 68 causes the feed pulp to jam between the rotor vanes 66 and the housing 68. Therefore the Rotary Air Lock Feeder was refitted with a six vane closed end rotor 64 that has reduced diameter. This reduction in diameter provides more clearance 69 between the vanes 66 and rotor housing 68 so the feed pulp can be run through the pulp feed device 60 without damaging fibers or jamming the pulp feed device 60. Additionally, the vanes 66 were reshaped from having a radial end, to having a flat end perpendicular to the radius of each vane 66. Without being bound by theory, it is believed that the flat ends of the vanes 66 reduced jamming of the pulp feed device 60 by providing an edge to shear fiber clumps of the feed pulp. It was found that if the Prater Industries rotor vanes had 0.050 inch removed from the centerline radius of each vane 66 having a rounded end, resulting in a 0.030 inch clearance 69 between the leading edge of each vane 66 and the rotor housing 68, rotor jamming as well air leakage around the rotor 64 were minimized. A clearance 69 from 0.010 to 0.050 inches should be effective for minimizing rotor jamming as well air leakage around the rotor 64.

Figure 5:
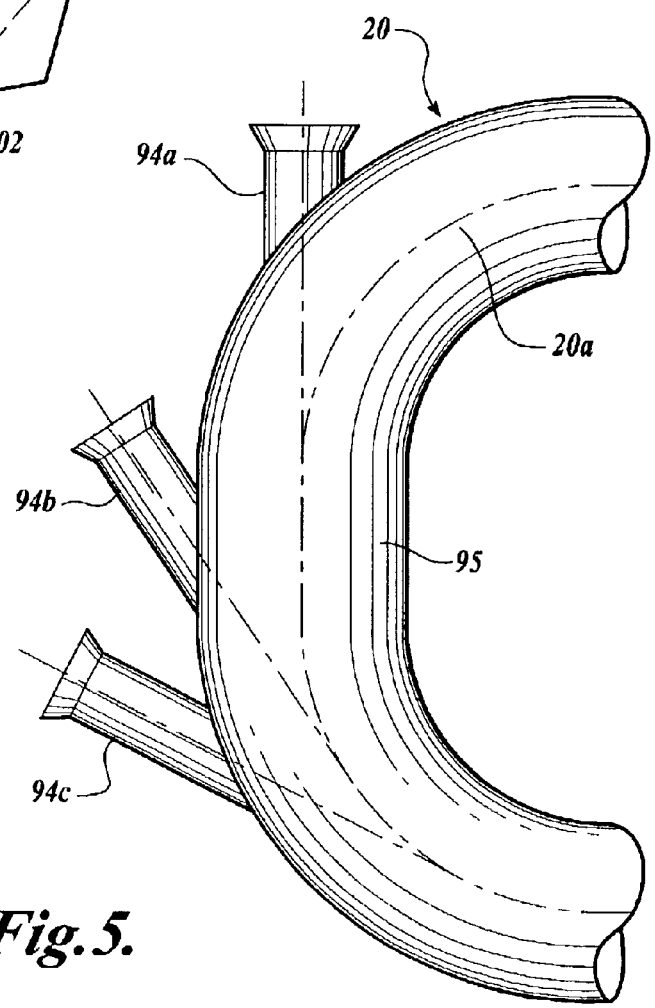
FIG. 5 is a schematic of a portion of the jet drier showing air injection ports.

Referring now to FIG. 5, an enlarged schematic view of the portion of the jet drier in which air is injected includes air inlet ports 94a, 94b and 94c These inlet ports are coupled to the air supply station 90 via feed conduit 94 (FIG. 1). These ports inject air into the curved housing 95 of the jet drier along lines substantially tangent to the flow path of material in the jet drier illustrated by dashed line 20a. These air inlet ports 94a–c are conventional portions of the jet drier described above.

Figure 6:
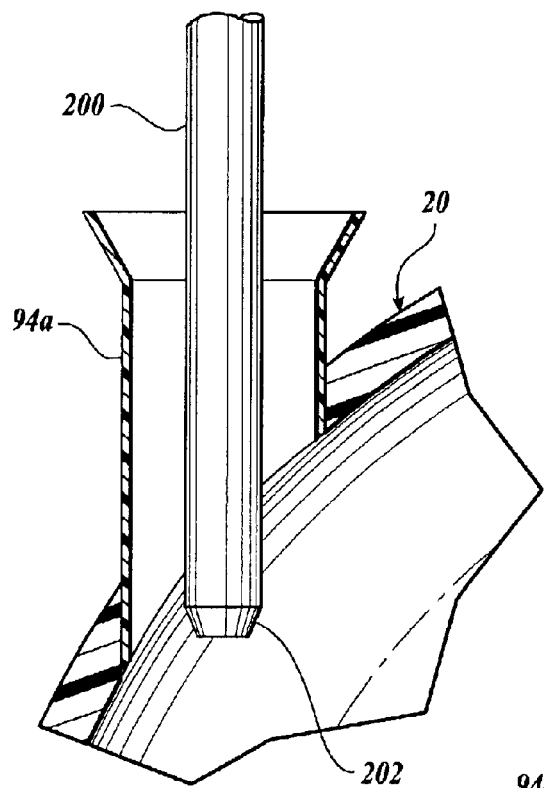
FIG. 6 is an enlargement of one of the air injection ports showing a steam injection nozzle.

Referring to FIG. 6, the jet drier is modified to include a steam injection nozzle 200. The steam injection nozzle 200 comprises a relatively small pipe having a nozzle 202 for injecting steam into the interior of the jet drier 20. The pipe 200 is positioned concentrically within the air injection port 94a. The interior diameter of the air injection port 94a was adjusted so that it allows the same air flow as if the steam injection pipe 200 were not positioned therein. Steam is supplied to the steam pipe 200 from conventional steam sources such as those commonly available in most industrial plants. Steam may be supplied at any desired pressure; however, is preferably supplied at a pressure of between 20 psig and 60 psig to the pipe 200. The size of the orifice in nozzle 202 can be varied from 1.5 mm to 6.5 mm. It is preferred, however, that the orifice be on the order of 6.35 mm and that steam be supplied in the range of 50–60 psig.

Referring again to FIG. 2, the air supply station 90 may include an air pump 96 and an air heater 98. The air pump 96 receives supply air via the air supply source 92 and is coupled in flow communication with air feed conduit 94. The air heater 98 is inserted into air feed conduit 94 and in flow communication with air pump 96 and the jet drier 20 manifold 26 via air feed conduit 94.

The air pump 96 may be a positive displacement high volume air pump that delivers the supply air at a positive air pressure and at a fixed volume to the air heater 98. One suitable air pump 96 for use in the present invention is a Roots-Dresser universal rotary lobe blower system (model number 45 URAI) with inlet silencer type CCF-4 with a paper element, a discharge silencer type Universal SD-4, filtration and electric 15 hp drive motor. The flow rate may be 300 sefin. The delivered pressure may be 5 psig. The pump speed may be 3176 rpm. The drive motor may run at 1800 rpm. The air pump 96 may have a gauge range of 0 to 15 psig and it may be fitted with a pressure relief valve set at 6 psig. The air heater 98 heats the supply air and delivers the feed air to the manifold 26 of the jet drier 20. The manifold 26 may feed the feed air tangentially into the jet drier 20 conduit 22 loop for the purpose of creating turbulence for fiberizing and drying the feed pulp inside the jet drier 20.

The air heater 98 may be a flow through type heater that is controlled to regulate the air temperature supplied to the jet drier manifold 26 nozzles that feed the conduit 22. The air heater 98 may be an electric heater, a gas heater or any other form of heater. One suitable air heater 98 for use in the present invention is a Watlow Electric Immersion heater, model number 700-96BD2459 that uses 480 VAC line voltage, and has a pressure rating of 150 psig at 1,050° F. The air heater 98 over temperature protection uses a type K thermocouple and a Watlow series 92 controller. The air heater 98 process temperature regulator uses type J thermocouples and Watlow series 965 auto tuning controller. The process air temperature is a process variable that has a direct affect on end product fiber appearance, end product fiber knot count, and fines content.

Upon exiting the jet drier 20, the outlet air, fibers, and fines may be transported along the outlet flow conduit 30 to be recovered by the fiber separation station 100. The fiber separation station 100 may be a vacuum conveyor 110 slidably associated with outlet flow conduit 30 through a head box 140. The vacuum conveyor 110 includes a screen 112, a first roller 118, a second roller 120, a primary fan vacuum box 122, a primary fan 128, a secondary fan vacuum box 130, and a secondary fan 134.

The vacuum conveyor 110 screen 112 is a porous conveyor belt device which passes the outlet air and fines through the screen 112 while preventing the flow of fiber through the screen 112. The screen 112 is a continuous loop rotatably coupled to the first roller 118 and the second roller 120. The screen 112 thus provides a screen upper portion 113 having a screen upper surface 114 and a screen lower surface 116, and a screen lower portion 117. The outlet flow conduit 30 from the jet drier 20 is slidably associated with the vacuum conveyor 110 by the head box 140 so that the outlet flow conduit 30 is in flow communication with the upper surface 114 of the screen 112. The outlet flow conduit 30 delivers fibers, fines, and outlet air to the upper surface 114. The screen 112 passes the outlet air through the upper surface 114 while retaining fibers on the upper surface 114. A fraction of the fines may be passed through the screen 112. Alternatively, the screen 112 may collect the fines by trapping them in the mat of fibers as the mat is formed in the outlet flow conduit 30 on the moving conveyer screen 112. This trapping of fines may result in a level of fines and opacity that does not require subsequent fines removal at the fines removal station 170. The rotating screen 112 transports the fibers from the outlet flow conduit 30 toward the fiber collection station 160, defining an upstream to downstream flow of fibers.

Figure 7:
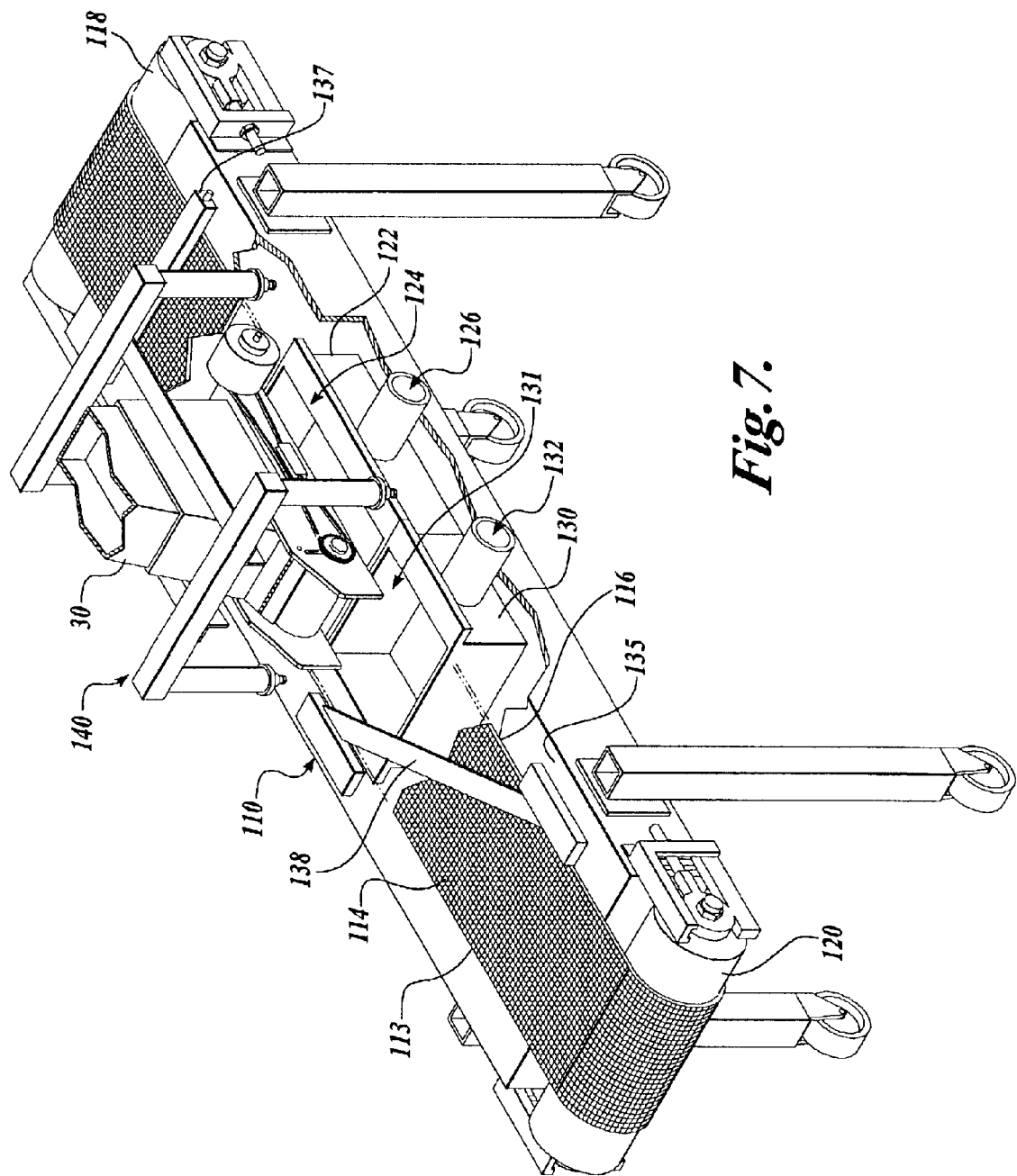
FIG. 7 is a perspective view of a fiber separation station of the present invention.
Figure 8:
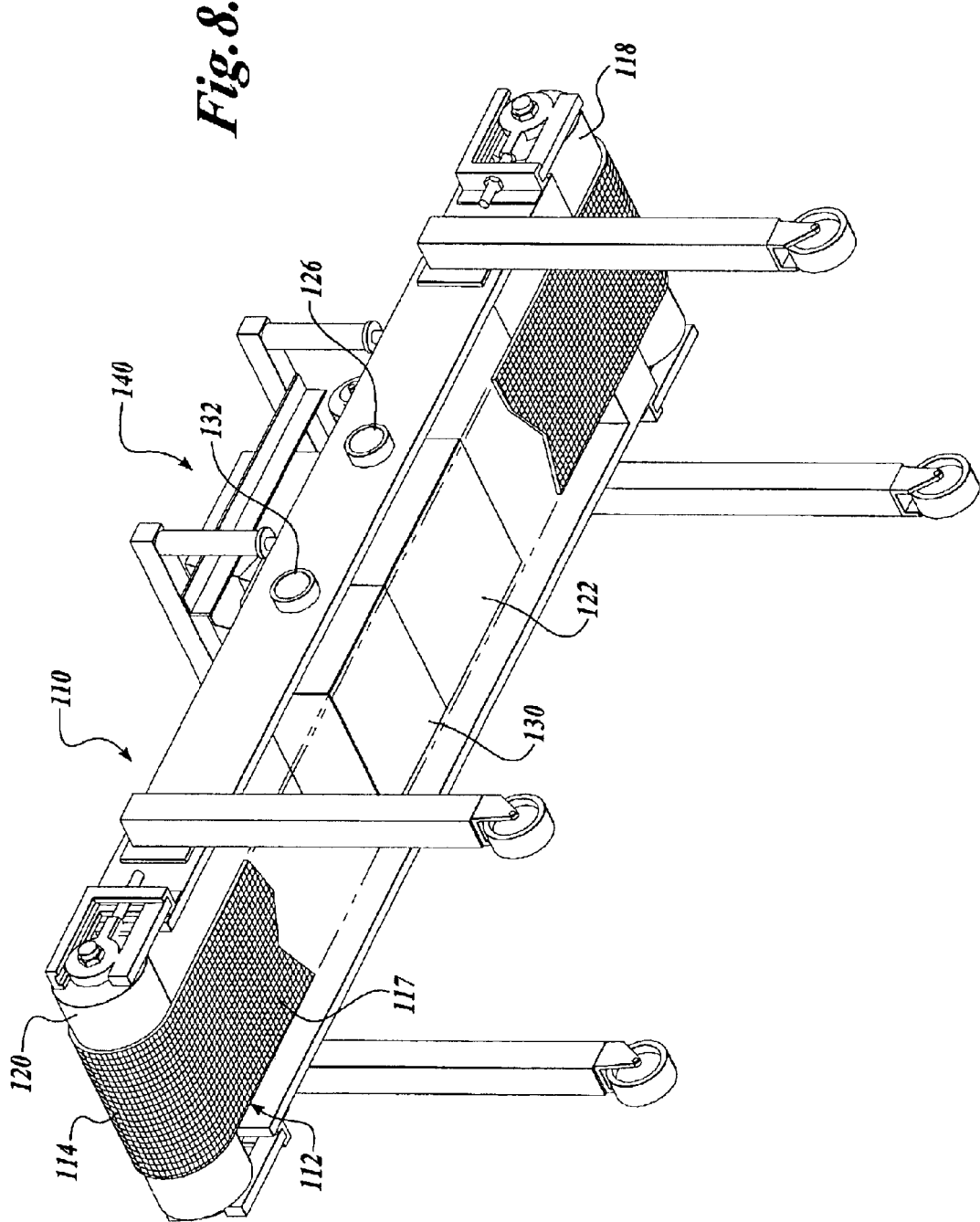
FIG. 8 is a bottom perspective view of the fiber separation station of the present invention.

Referring to FIGS. 7 and 8, the primary fan vacuum box 122 is a plenum that allows passage of outlet air and fines from the outlet flow conduit 30 through the screen to the primary fan 128. Referring to FIG. 7, the primary fan vacuum box 122 has an inlet 124 and an outlet 126. The primary fan vacuum box inlet 124 is positioned below the screen 112 upper portion 113 and slidably associated with the lower surface 116 of screen 112 directly under the head box 140, and is thus in flow communication with outlet flow conduit 30 through head box 140 and screen 112. The inlet to the primary fan vacuum box 122 is matched in size to the head box 140 to allow the head box 140 to seal against the primary fan vacuum box 122 conduit opening while allowing the screen 112 to freely pass therebetween without allowing tramp air to affect the vacuum generated by the primary fan 128.

Referring to FIG. 2, The vacuum conveyor 110 primary fan 128 is coupled in flow communication between the primary fan vacuum box outlet 126 and fines conduit 172. The primary fan 128 pulls the outlet air from the outlet flow conduit 30, through the head box 140, through the screen 112 upper surface 114, through the primary fan vacuum box 122, and to the primary fan 128 for expulsion to fines conduit 172. The primary fan vacuum box 122 allows the primary fan 128 to generate enough vacuum on the jet drier 20 to transport the fiber from the jet drier 20 to the screen 112. The porous conveyor screen 112 retains a portion of the fibers from passing through to the primary fan 128. The porous conveyor screen 112 conveys the fibers away from the outlet flow conduit 30 and toward the second roller 120, by rotating about the first and second rollers 118 and 120. The fibers thus form a mat on the screen upper surface 114.

The vacuum or negative pressure is defined herein as the null. The null is an internal positive or negative pressure inside the jet drier 20 that is measured in the centrifugal part of the process air stream near the pulp intake 24 and between the pulp intake 24 and the fiber outlet 28 of jet drier 20. The null is a process control variable that has a direct affect on the through put of the jet drier 20 and the knot count of the fibers. The main variables that affect null are as follows: the vacuum generated by the primary fan 128 on the jet drier 20, feed rate of the feed pulp into the jet drier 20, moisture content of the feed pulp, non-uniformity in pulp size and shape, screen 112 speed and mesh size, pulp type and treatment, damper settings on the primary fan 128, and the temperature of process air fed into the jet drier 20 at the manifold 26. The screen 112 speed is a process control variable that has a direct affect on null. The rate at which the screen 112 transports the fibers from the outlet flow conduit 30 determines the thickness or density of the mat of fibers being formed on the upper surface 114 of screen 112. The density of this mat of fibers constricts the volume of outlet air flowing through the system thus affecting the null. The jet drier 20 null is preferably maintained from −1 to −5 inches of water.

The primary fan 128 may be a side intake, high temperature, high volume exhaust fan. One suitable primary fan 128 for use in the present invention is a steel high temperature side intake material handling fan with a 10 hp motor with 460 VAC line voltage and may be connected with airtight seals to the primary fan vacuum box 122. An adjustable damper at the exhaust side controls the level of airflow through the primary fan 128 which has a direct affect on the jet drier 20 null, and therefore affects the end product fiber appearance and knot count.

Referring to FIGS. 7 and 8, the secondary fan vacuum box 130 is a plenum that allows the secondary fan 134 to pull air through the screen 112 to provide suction on the upper surface 114 of screen 112. Referring to FIG. 7, the secondary fan vacuum box 130 has an inlet 131 and outlet 132. The secondary vacuum box inlet 131 is slidably associated with the lower surface 116 of the screen 112 and is positioned below the upper portion 113 of screen 112 downstream from the primary fan vacuum box 122. The inlet to the secondary fan vacuum box 130 is positioned just downstream of the terminus of the head box 140. The secondary vacuum box outlet 132 is in flow communication with the secondary fan 134.

It will be understood that although the vacuum conveyor 110 has been described as having primary and secondary fans 128 and 134, a single fan device with dampers may serve as both the primary and secondary fans 128 and 134 without departing from the present invention. The fan vacuum boxes 122 and 130 may have a honeycomb shaped baffle to distribute the intake of fresh air through the mat of fibers on the screen upper portion 113.

Referring to FIG. 2, the vacuum conveyor 110 secondary fan 134 is coupled in flow communication between the secondary fan vacuum box outlet 132 and fines conduit 172. The secondary fan 134 provides a vacuum which pulls on the mat of fibers being conveyed on the upper surface 114. The secondary fan 134 pulls air through the screen 112, through the secondary fan vacuum box 130, and to the secondary fan 134 for expulsion to fines conduit 172. The porous conveyor screen 112 prevents the fibers from passing through to the secondary fan 134. The secondary fan 134 retains the mat of fibers on the screen 112 while the screen 112 is in motion and aids in the extraction and transport of the mat of fibers by creating a vacuum that is strong enough to prevent the primary fan 128 from pulling fibers back into the head box 140. Without the secondary vacuum 134 to hold the mat of fibers intact, the vacuum created by the primary fan 128 in the head box 140 may pull the mat of fibers back into the head box 140. Without the secondary vacuum 134 the result could be an inconsistent mat density inside the head box 140 causing a fluctuation in null resulting in non-uniform mat of fibers, inconsistent fiber separation in the end product, and, eventually, process shut down due to a plugging of the head box 140 with excess fiber.

The secondary fan 134 may be a side intake low velocity exhaust fan. One suitable secondary fan 134 for use in the present invention is a fan manufactured by Buffalo with a ¼ hp motor with 110 VAC line voltage. It has variable speeds and may be connected with airtight seals to the secondary fan vacuum box 130.

Referring to FIGS. 7 and 8, the vacuum conveyor 110 includes a support structure 135. The support structure 135 provides a surface to support the moving screen 112. The support structure 135 is shown extending between and supporting the first roller 118 and the second roller 120, along the same plane as that of the screen lower surface 116. The openings of the vacuum boxes are located in the support surface 135. It will be understood that, although shown as a single object, the support structure 135 may comprise many separate support structures unassociated with one another.

The vacuum conveyor 110 may optionally include a screen vacuum 137. The screen vacuum 137 removes any residual fibers from the screen 112 before the screen 112 receives new fibers from outlet flow conduit 30. The screen vacuum 137 may be located anywhere along screen 112 after the fiber mat has been removed. In one embodiment, the screen vacuum 137 is a vacuum manifold slidably associated with the upper surface 114 of screen 112, upstream of the head box 140. One suitable screen vacuum 137 for use in the present invention is a Sears Shop Vacuum and an unmodified vacuum attachment. Alternatively, the primary fan 128 may be used as the vacuum source for the screen vacuum 137. In another embodiment, an air supply device may be positioned on the opposite side of screen 112 from the screen vacuum 137 to force air through the screen 112 and into the screen vacuum 137.

The vacuum conveyor 110 may optionally include a separation device 138. The vacuum conveyor 110 separator device may be a thin physical barrier running across and slidably associated with the upper surface 114 of the screen 112 above the downstream end of the secondary vacuum box 130. The separation device 138 serves to loosen the collected mat of fibers from the upper surface 114 of the screen 112 so that the fibers may easily be removed from the screen 112, for instance by gravity, at the vacuum conveyor 110 terminal end adjacent roller 120. The separator device 138 may also separate the entangled mat of fibers from the screen 112 and re-lay the mat on the screen 112 without changing the physical properties of the mat of fibers. The fibers may then be collected at the fiber collection station 160 into a bulk mass which can be compressed into a bale for shipping to a customer. One suitable separation device 138 for use in the present invention is a blade made from Teflon sheet 0.030 inches thick by 2 inches wide placed at a 45 degree angle across the screen 112 at the downstream end of the secondary fan vacuum box 130 and secured at both ends of the separation device 138 to the support structure 135.

Alternatively, the separation device 138 may be a gas blowing device operatively associated with the screen 112, and located beneath the screen 112 downstream from the secondary vacuum box 130. The gas blowing separation device 138 would force gas up through screen 112 to separate the mat of fibers from the screen.

The fiber separation station 100 includes a head box 140 coupled to the end of the outlet flow conduit 30, for slidably associating outlet flow conduit 30 with screen 112. The head box 140 is an apparatus where the separation of entrained fibers and outlet air occurs. In one embodiment, the head box 140 has a vacuum tight seal against upper surface 114 of the screen 112 where the outlet air and fines are removed. The fibers are trapped on the moving screen 112 and the outlet air and fines pass through the mat of fiber and through the screen 112.

Figure 9:
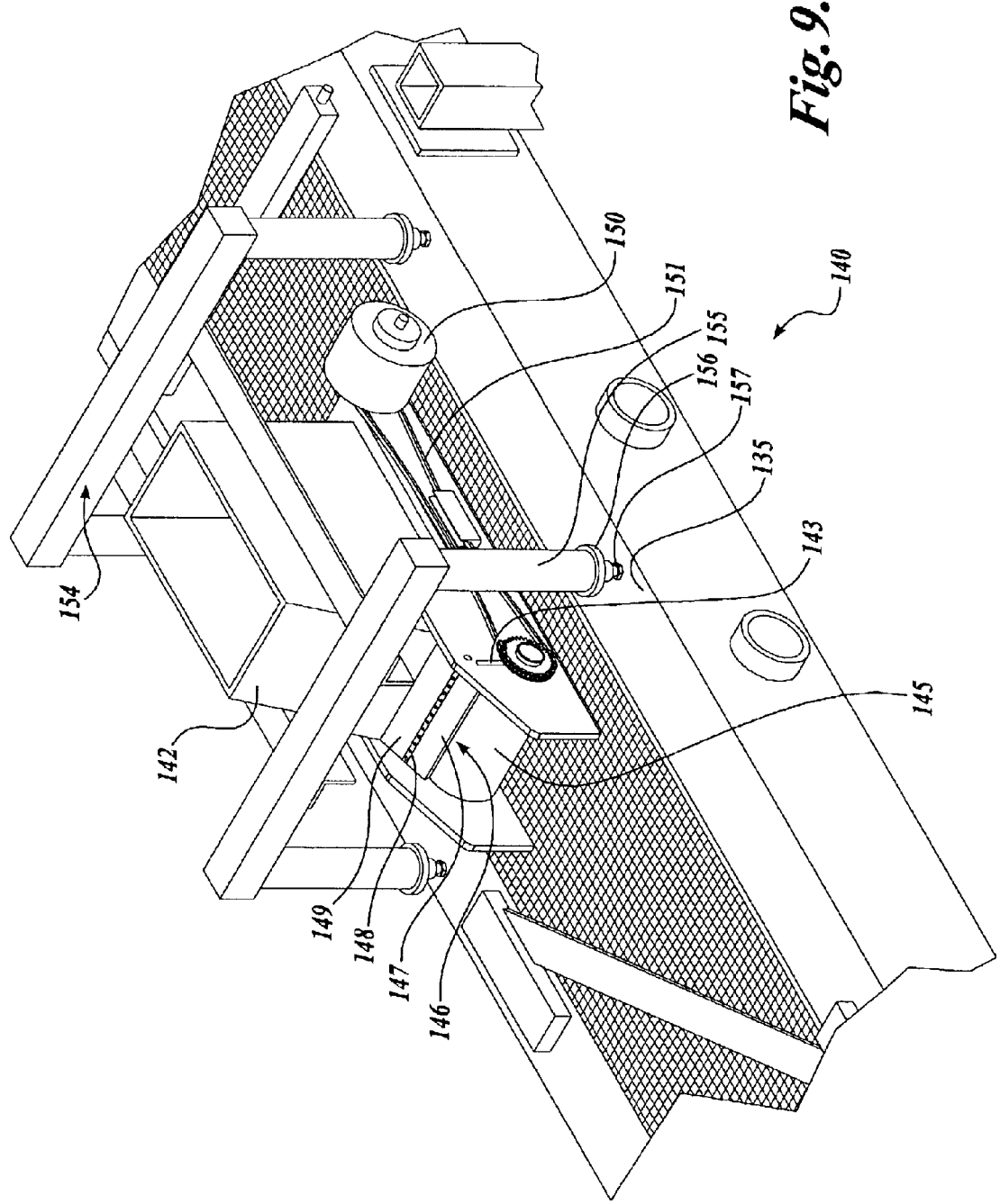
FIG. 9 is an enlarged perspective view of the fiber separation station of the present invention.

Referring to FIG. 9, the head box 140 includes a head box shell 142, an out feed roller 145 and a dynamic lip seal 146. The head box shell 142 is in flow communication between the outlet flow conduit 30 and the upper surface 114 of the screen 112. The head box 140 out feed roller 145 is positioned at the downstream end of head box shell 142 (also referred to as the outlet side of the head box shell 142). The head box 140 out feed roller 145 is rotatably and movably coupled to the head box shell 142, and rollably associated with the upper surface 114 of the screen 112. The dynamic lip seal 146 is positioned above the out feed roller 145 at the downstream end of box shell 142. The dynamic lip seal 146 is hingedly coupled to the head box shell 142, and slidably associated with the out feed roller 145.

The head box 140 may be composed of a low friction material, wherever moving parts are in contact. For instance, the head box shell 142 may be composed of Teflon where the head box shell 142 contacts the screen 112. Additionally, the head box shell 142 may be composed of Teflon where the head box shell 142 contacts the out feed roller 145.

The head box shell 142 preferably includes vertically oriented slots 143. The axles of the out feed roller 145 are positioned in the slots 143. The slots 143 allow the out feed roller 145 to move in an up and down manner to adjust for the varying thickness of the fiber mat on screen 112.

The out feed roller 145 is positioned at the downstream end of head box 140 to provide a force for pulling the fibers along the screen 112 and out of the head box 140. The out feed roller 145 may otherwise be a belt or rotor, or other similar device. The out feed roller 145 may be powered by any conventional source. The bottom surface of the out feed roller 145 provides an additional force for pulling the fibers along the screen 112 and out of the outlet flow conduit 30. The out feed roller 145 may be made from Teflon coated steel.

The dynamic lip seal 146 allows the head box 140 to maintain a vacuum tight seal against upper surface 114 of the screen 112. The dynamic lip seal 146 seals the out feed roller 145 to the head box shell 142. This design allows the out feed roller 145 to rotate and travel vertically to compensate for non-uniform mat of fiber thickness at the out feed of the head box 140, without drawing tramp air from around the out feed roller 145. The dynamic lip seal may be made from an inflexible piece 147 joined to a flexible piece 149 by a pivot portion 148. The pivot potion 148 is rotatably coupled to the head box shell 142. The inflexible piece 147 moves up and down in response to the motion of out feed roller 145. The flexible piece 149 allows the inflexible portion to move, while maintaining a vacuum seal against the head box shell 142. The inflexible piece 147 and the flexible piece 149 may be formed of Teflon having differing thickness.

Optionally, the head box 140 further may include a pair of drive wheels 150 for driving the out feed roller 145. The drive wheels 150 are rotatably coupled to the upstream end of head box shell 142, in driving communication with the out feed roller 145, and also in mechanical communication with the screen 112. The drive wheels 150 rotate in response to the movement of screen 112 and transfer that movement to the out feed roller 145 to rotate the out feed roller 145. The drive wheels 150 drive the out feed roller 145 with the use of a coupling device 151. The coupling device 151 may be a chain coupling or any other device capable of mechanically associating the drive wheels 150 and out feed roller 145 to turn in unison. It is preferred that the drive wheels 150 be coupled to the out feed roller 145 at a 1:1 ratio, to enable the surface of out feed roller 145 to rotate at the same rate as screen 112.

The head box 140 may also include a height adjustment structure 154. The height adjustment structure 154 is connected to the head box shell 142 and to the support structure 135. The height adjustment structure 154 enables space between the head box shell 142 and screen 112 to be adjusted. The height adjustment structure 154 includes a frame 155, an adjustment nut 156, and an adjustment bolt 157. The frame 155 is connected to the head box shell 142. The adjustment bolt 157 is connected to the support structure 135. The adjustment nut 156 is adjustably connected to the adjustment bolt 157 and is also connected to the frame 155. As the adjustment nut 156 is adjusted along the adjustment bolt 157, the adjustment nut 156 acts on the frame 155 to increase or decrease the space between the head box shell 142 and screen 112.

Alternatively the fiber separation station 100 may be a cyclone, bag house, or other similar device for removing fines and fiber together from outlet air. The fiber separation station 100 may then recycle the separated outlet air back to the air supply station 90. In this embodiment, the fines removal station 170 may be located upstream along conduit 30, to remove the fines from the fibers prior to the fibers being recovered at the fiber separation station 100.

Referring again to FIG. 2, the drying system 10 fines removal station 170 receives outlet air and fines from the fiber separation station 100. The fines removal station 170 is coupled in flow communication with the fines conduit 172 and the air conduit 182. The fines removal station receives fines and outlet air from fines conduit 172, removes at least a portion of the fines, and discharges the outlet air to the air conduit 182. The fines removal station 170 may then recycle the outlet air back to the air supply station 90. The fines removal station 170 may be a cyclone, bag house, or other similar device.

Alternatively, the fines removal station 170 is coupled to the outlet flow conduit 30 between the jet drier 20 and the fiber separation station 100. The fines removal station 170 in this embodiment may include a cyclone similar to that used as a dust collector for sawdust in wood shops. The fines removal station 170 receives outlet air, fines, and fibers from the jet drier; removes at least a portion of the fines; and sends the fiber coming from the jet drier 20 to the fiber separation station 100. The fines removal station 170 of this embodiment may further include a second cyclone, bag house, or other similar device located at the primary and secondary fan 128 and 134 outlets. This second cyclone may also receive the filtered fines exhaust from the first cyclone.

The drying system 10 noise reduction station 180 is inserted into air conduit 182 and in flow communication with the fines removal station 170 via air conduit 182. The noise reduction station 180 provides a reduction in the noise produced by the drying system 10. The noise reduction station 180 receives outlet air from the fines removal station 170 via air conduit 182, absorbs kinetic energy from the outlet air, and discharges the outlet air via air conduit 182. The discharged outlet air may be vented to the atmosphere or recycled to the air supply station 90.

Alternatively the noise reduction station 180 is directly coupled to the primary and secondary fans 128 and 134. The noise reduction station 180 may be a cyclone ducted to the exhaust from the primary fan 128. The exhaust from the primary fan 128 is discharged into the input side of the cyclone and the cyclone outlet ports are independently vented to atmosphere. The exhaust from the secondary fan 134 may be vented to the cyclone or to the cyclone outlet ports. Additionally, the fines removal station 170 may also serve as a noise reduction station.

The drying system 10 described above forms singulated and dried fibers. The process takes wet pulp directly from a pulp mill and produces a singulated product from the never-dried pulp by using a drying process that singulates the pulp directly. This avoids the intermediate steps of the pulp drier, handling of the pulp reels and rolls, and hammermilling in a traditional process. The drying system 10 produces fibers having a low knot and fines content. These fibers also have physical characteristics such as kink, curl, and twist that are more pronounced than fibers processed by hammermilling. The drying system 10 also produces fibers that have been treated with a treatment substance. The treatments that can be performed on the pulp may be difficult or impossible to perform on a roll of dried pulp. Treatments can be done on the pulp that reduce the amount of knots, increase production rate, and/or form fibers having desirable characteristics.

Figure 10:
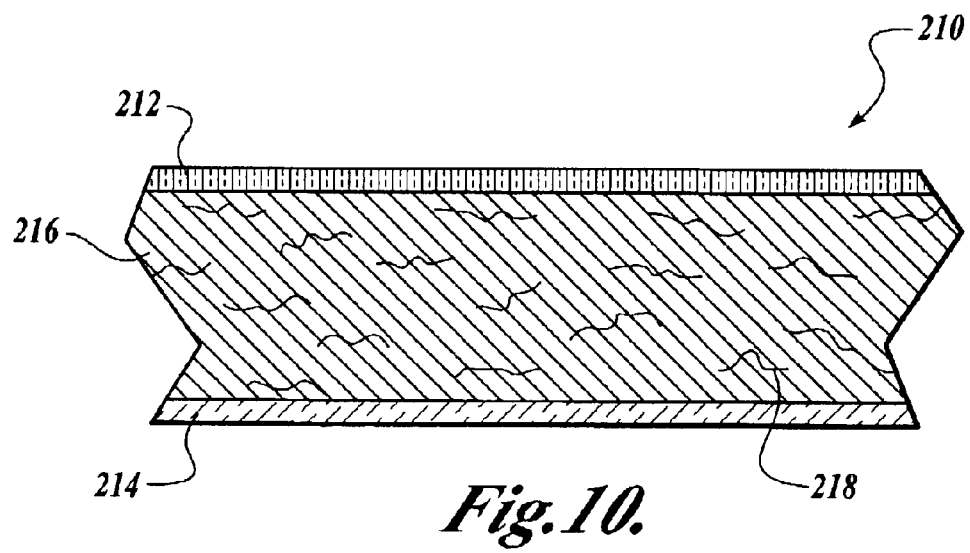
FIG. 10 is a schematic diagram of an absorbent article of the present invention.

The dried and singulated fibers produced in drying system 10 may be used in any number of end products including but not limited to absorbent articles, concrete products, plastic products, filter product, and paper products. Referring to FIG. 10, the absorbent article 210 includes a pervious top portion 212, an impervious bottom portion 214, and an absorbent layer 216 located between the pervious top portion 212 and the impervious bottom portion 214. The absorbent layer 216 includes singulated and dried fibers 218. It will be understood that the term absorbent article, as used herein, includes but is not limited to diapers, tampons, sanitary napkins, incontinence guards, and bandages.

Figure 11:
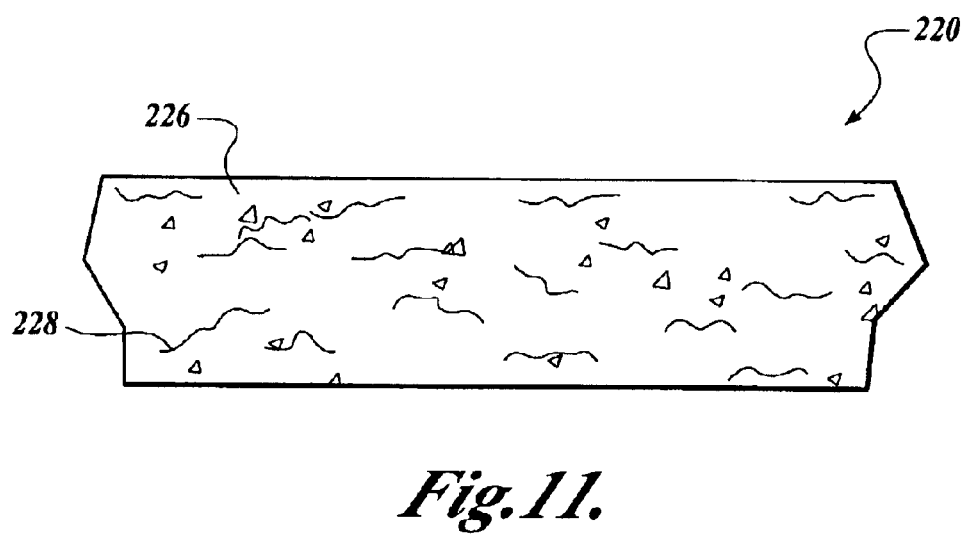
FIG. 11 is a schematic diagram of a concrete or plastic product of the present invention.

Referring to FIG. 11, the concrete product 220 includes a concrete matrix 226 having singulated and dried fibers 228 incorporated therein. It will be understood that the term concrete products, as used herein, includes but is not limited to cement, concrete, mortars, precast material, high strength cement products, extruded cement products, gypsum products, and any other cemeticious material. It will be understood that while FIG. 11 has been illustrated as a concrete product 220, FIG. 11 may also show a plastic product 220 including a plastic matrix 226 having singulated and dried fibers 228 incorporated therein. It will be understood that the term plastic products, as used herein, includes but is not limited to plastics and rubbers.

Figure 12:
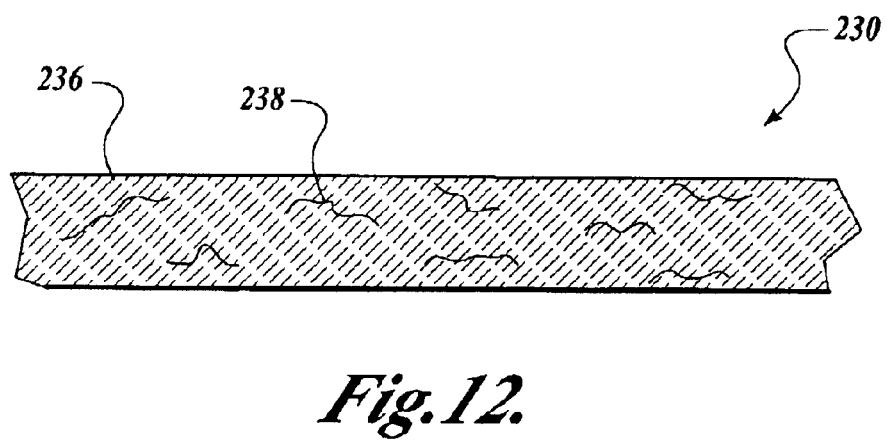
FIG. 12 is a schematic diagram of a paper or filter product of the present invention.

Referring to FIG. 12, the paper product 230 includes a paper sheet 236 having singulated and dried fibers 238 incorporated therein. It will be understood that the term paper products, as used herein, includes but is not limited to paper and paperboard. It will be understood that while FIG. 12 has been illustrated as a paper product 230, FIG. 12 may also show a filter product 230 having singulated and dried fibers 238 incorporated therein.

EXAMPLES

In the processing of pulp into dry singulated fibers used in the examples below, several process conditions were evaluated. The effects of variations in the jet drier temperature, feed rate, types of pulp, feed rate, and pre-drying dewatering methods were all explored in the Examples below.

Unless otherwise noted, the apparatus used for the Examples below is as follows: pulp was dried and singulated into fibers using a Fluid Energy A1jet Model 4 Thermajet, X0870L jet drier. No modifications were made to the Model 4 Thermajet except for the steam injection system described above in conjunction with FIGS. 5 and 6. The pulp was fed to the jet drier in several different apparatuses. For large runs a shaftless screw conveyor manufactured by Martin Sprocet and Grear, Inc., Martin Conveyor Division was used. It had a hopper at the lower end of the conveyer for placing the wet pulp, and conveyed the wet pulp up an incline that rose up towards the pulp feed device on the jet drier. For runs of low quantities of pulp, a Weyerhaeuser designed and manufactured conveyor with hopper type feeder for feeding wet pulp was used. For feeding fibers suspended in a foam medium a Weyerhaeuser redesigned and modified OAKES mechanical mixer was used to directly inject foamed pulp into the jet drier.

In Examples 1–9, the feed pulp used was a pressed wet web of pulp having a basis weight of a substantial amount to provide sufficient stiffness to feed the web into a shredding device. The wet web was produced on a pilot papermachine that had a spray system attached to it to allow treatment of the wet web prior to pressing. A basis weight of 500 to 1500 gsm was found to work adequately. The web was fed into the shredding device through a rotating and reversible roller nip and into a rapidly rotating set of rolls containing protruding pins that tore the web into small pieces of pulp.

The feed pulp was delivered to the jet drier using a stainless steel Prater Industries Rotary Air Lock Feeder model number PAV-6C having a rotor housing, and a CLSD, SS,PAV-6 rotor with six rotor vanes. The refitted rotor was a custom modified six vane closed end rotor that was reduced in diameter to give more clearance between the vane and rotor housing so wet pulp could be run through the feeder without damaging fibers or jamming the rotor.

The feed air was delivered to the jet drier with a Roots-Dresser universal rotary lobe blower air pump with silencer and filtration. The model number was 45 URAI. The flow rate was 300 SCFM. The delivered pressure was 5 psig. The pump speed was 3176 rpm. The drive motor was an electric Lincoln 15 hp that was running at 1800 rpm. The air pump had an inlet silencer type CCF-4 with a paper element and a discharge silencer type Universal SD-4. The assembly had a gauge range of 0 to 15 psig and it was fitted with a pressure relief valve set at 6 psig.

The feed air was heated with a Watlow Electric Immersion air heater, model number 700-96BD2459. The air heater used 480 VAC line voltage, and had a pressure rating of 150 psig at 1,050° F. The over temperature protection used a type K thermocouple and a Watlow series 92 controller. The process temperature regulator used type J thermocouples and Watlow series 965 auto tuning controller.

The steam was fed through the injection nozzle as described above. The steam pressure was varied for 50 psig to 60 psig for nozzle diameters of 7 mm and 5.1 mm, respectively.

A material handling fan (MHF) was placed in the ducting between the jet drier and the vacuum conveyer. The MHF was used in Examples 1–8, but was not used in Examples 9–24.

The outlet air, fibers and fines were delivered to a custom designed vacuum conveyor via a head box sealed to the conveyor screen. A Sears Shop Vacuum with an unmodified vacuum attachment was used for the screen vacuum. The primary fan was a steel high temperature side intake material handling fan with airtight seals to the primary fan vacuum box. The primary fan had a 10 hp motor with 460 VAC line voltage. An adjustable damper at the exhaust side controlled the level of airflow through the fan which had a direct effect on the jet drier null, which created a vacuum of −1 to −5 inches of water. The exhaust from the primary fan discharged into a cyclone that currently serves the purpose of noise reduction. The secondary fan was manufactured by Buffalo and had a ¼ hp motor with 110 VAC line voltage. The secondary fan had variable speeds and was connected with airtight seals to the secondary fan vacuum box. The secondary fan discharged to the exhaust side of the cyclone. The separation device was made from Teflon sheet 0.030 inches thick by 2 inches wide placed at a 45 degree angle across the conveyor screen at the down stream end of the secondary fan vacuum box.

In the examples below, "sonic knots" were tested by the following method for classifying dry fluffed pulp into three fractions based on screen mesh size. The first fraction is the knots and is defined as that material that is captured by a No. 12 mesh screen. The second fraction is the accepts or the singulated fibers and is defined as that material that passes through a No. 12 mesh screen but is captured by a No. 60 mesh screen. The third fraction is of the fines and is defined as that material that passes through a No. 12 and through a No. 60 mesh screen. The separation is accomplished by sound waves generated by a speaker that are imposed upon a pre-weighed sample of fluff pulp placed on a No. 5 mesh screen that is near the top of a separation column where the speaker sits at the very top. After a set period of time, each fraction is removed from the separation column and weighed to obtain the weight fraction of knots, accepts/singulated fiber and fines.

To test the effects of steam, the steam nozzle is first initially removed from the air intake port and a dummy plug inserted. The jet dryer was then started and pulp fed thereto. Once the dryer had stabilized, the dummy plug was removed and the steam nozzle inserted. Before the steam nozzle was inserted, the nozzle was purged outside of the jet dryer until steam and no condensed water came from the nozzle. Thereafter, the steam was turned off. Once the nozzle was inserted, the steam valve was gradually opened until there was a full flow of regulated steam into the dryer.

Example 1

Dried, singulated pulp was produced by re-wetting never dried pulp at approximately 5% solids made from sawdust (Kamloops TYEE) in a hydropulper to a consistency of approximately 3% solids. The re-wetted pulp was then transferred to a holding tank with recirculation to keep the pulp in suspension. The pulp was taken from the recirculation line with a Moyno (brand) positive displacement pump and feed to a TEMA (brand) continuous centrifuge with a discharge breaker ring at its output. The pulp used in table 1 was used as is from the centrifuge output without any further de-lumping or pre-drier feed treatments. These pulp fibers had a length on the order of 1.2 mm. The pulp was unbleached and never dried. Runs were repeated at different feed rates and inlet and outlet temperatures as set forth in table 1 below. Alternating runs with and without steam were conducted. Samples were collected after the jet dryer had stabilized with the steam injection. This normally took on the order of about five minutes. One observed effect of adding the steam is that the outlet temperature from the jet dryer became much more stable than when run without steam. In addition, the injection of steam produced a fiber mat on the vacuum screen that appeared to be much more uniform than that produced without steam. The product moisture was still in an acceptable criteria range of about 6% or less. The knots, accepts and fines for each of the runs are set forth in table 1 below.

TABLE 1

| Line Item | Special | Dewatering | Bleach | Status | Feed rate g/min (OD) | Null | Inlet Temp °C. | Outlet Temp °C. | Knots % | Accepts % | Fines % | Steam psi | steam line orifice mm |
|---|---|---|---|---|---|---|---|---|---|---|---|---|---|
| 299 | No steam | continuous centrifuge | unbleached | never-dried | 115 | −3 | 170 | 106 | 2.96 | 64.05 | 32.99 | | |
| 310 | steam | continuous centrifuge | unbleached | never-dried | | −1 | 170 | 104 | 2.34 | 61.82 | 35.84 | 50 | 7 |
| 300 | No steam | continuous centrifuge | unbleached | never-dried | 92 | −1 | 200 | 153 | 2.47 | 56.67 | 40.87 | | |
| 311 | steam | continuous centrifuge | unbleached | never-dried | | <0 | 200 | 145 | 2.27 | 59.67 | 38.07 | 50 | 7 |
| 301 | No steam | continuous centrifuge | unbleached | never-dried | 64 | <0 | 200 | 148 | 1.98 | 65.12 | 32.9 | | |
| 312 | steam | continuous centrifuge | unbleached | never-dried | | −1 | 200 | 139 | 2.05 | 63.54 | 34.4 | 50 | 7 |
| 302 | No steam | continuous centrifuge | unbleached | never-dried | 197 | −2 | 200 | 120 | 2.06 | 63.12 | 34.82 | | |
| 313 | steam | continuous centrifuge | unbleached | never-dried | | <0 | 200 | 115 | 2.67 | 61.6 | 35.73 | 50 | 7 |
| 303 | No steam | continuous centrifuge | unbleached | never-dried | 115 | −2 | 220 | 171 | 2.06 | 63.17 | 34.77 | | |
| 314 | steam | continuous centrifuge | unbleached | never-dried | | −1 | 220 | 155 | 2.47 | 62.53 | 35 | 50 | 7 |
| 304 | No steam | continuous centrifuge | unbleached | never-dried | 129 | −2 | 220 | 145 | 3.6 | 63.87 | 32.53 | | |
| 315 | steam | continuous centrifuge | unbleached | never-dried | | <0 | 220 | 133 | 2.00 | 62.2 | 35.8 | 50 | 7 |
| 305 | No steam | continuous centrifuge | unbleached | never-dried | 178 | <0 | 220 | 119 | 3.53 | 62.49 | 33.98 | | |
| 316 | steam | continuous centrifuge | unbleached | never-dried | | −1 | 220 | 111 | 3.00 | 60.4 | 36.6 | 50 | 7 |
| 306 | No steam | continuous centrifuge | unbleached | never-dried | 167 | −2 | 270 | 171 | 1.86 | 59.56 | 38.58 | | |
| 317 | steam | continuous centrifuge | unbleached | never-dried | | <0 | 270 | 155 | 2.25 | 64.1 | 33.65 | 50 | 7 |
| 307 | No steam | continuous centrifuge | unbleached | never-dried | 217 | −2 | 270 | 150 | 4.21 | 61.21 | 34.58 | | |

TABLE 1-continued

| Line Item | Special | Dewatering | Bleach | Status | Feed rate g/min (OD) | Null | Inlet Temp ° C. | Outlet Temp ° C. | Knots % | Accepts % | Fines % | Steam psi | steam line orifice mm |
|---|---|---|---|---|---|---|---|---|---|---|---|---|---|
| 318 | steam | continuous centrifuge | unbleached | never-dried | 217 | <0 | 270 | 110 | 3.96 | 60.3 | 35.74 | 50 | 7 |
| 308 | No steam | continuous centrifuge | unbleached | never-drived | 343 | −1 | 270 | 119 | 5.62 | 58.77 | 35.62 | | |

Example 2

Example 1 was repeated on unbleached Douglas fir fibers. These fibers had an average length on the order of 2.4 mm to 2.5 mm. This pulp was once dried. The pulp was acquired in bale form comprising a plurality of pulp sheets. The pulp sheets were re-wetted in a hydropulper to a solids consistency of approximately 5% for a period of time that when a sample of pulp was taken from the hydropulper and tested, it showed no visual fiber bundles in a slurry, and that the pulp fibers had fully dispersed as if they were never a drier sample. The re-wetted pulp was then transferred to a holding tank with recirculation to keep the pulp in suspension. The pulp was taken from the recirculation line with a Moyno (brand) positive displacement pump and feed to a TEMA (brand) continuous centrifuge with a discharge breaker ring at its output. The pulp was used as is from the centrifuge output without any further de-lumping or pre-drier feed treatments.

The results are set forth in table 2 below.

TABLE 2

| Line Item | Special | Dewatering | Bleach | Status | Feed rate g/min (OD) | Null | Inlet Temp ° C. | Outlet Temp ° C. | Knots % | Accepts % | Fines % | Steam psi | steam line orifice mm |
|---|---|---|---|---|---|---|---|---|---|---|---|---|---|
| 320 | No steam | continuous centrifuge | unbleached | bale | 220 | −3 | 150 | 96 | 11.65 | 76.15 | 12.2 | | |
| 332 | steam | continuous centrifuge | unbleached | bale | 220 | −2 | 150 | 96 | 9.4 | 77.4 | 13.2 | 50 | 5.1 |
| 321 | No steam | continuous centrifuge | unbleached | bale | 160 | −3 | 170 | 108 | 6.49 | 81.15 | 12.36 | | |
| 333 | steam | continuous centrifuge | unbleached | bale | 160 | −2 | 170 | 106 | 5.4 | 82.33 | 12.27 | 50 | 5.1 |
| 322 | No steam | continuous centrifuge | unbleached | bale | 117 | −3 | 200 | 155 | 5.09 | 82.28 | 12.63 | | |
| 334 | steam | continuous centrifuge | unbleached | bale | 117 | −3 | 200 | 142 | 5.27 | 84.27 | 10.47 | 50 | 5.1 |
| 323 | No steam | continuous centrifuge | unbleached | bale | 155 | −1 | 200 | 138 | 7.27 | 79.67 | 13.07 | | |
| 335 | steam | continuous centrifuge | unbleached | bale | 155 | −1 | 200 | 128 | 4.47 | 85.27 | 10.27 | 50 | 5.1 |
| 324 | No steam | continuous centrifuge | unbleached | bale | 213 | −1.5 | 200 | 125 | 12.31 | 77.35 | 10.34 | | |
| 336 | steam | continuous centrifuge | unbleached | bale | 213 | −1 | 200 | 118 | 6.27 | 80.65 | 13.08 | 50 | 5.1 |
| 325 | No steam | continuous centrifuge | unbleached | bale | 120 | −3 | 220 | 170 | 5.9 | 81.41 | 12.69 | | |
| 337 | steam | continuous centrifuge | unbleached | bale | 120 | −1 | 220 | 159 | 2.67 | 83.13 | 14.2 | 50 | 5.1 |
| 326 | No steam | continuous centrifuge | unbleached | bale | 166 | −2 | 220 | 150 | 6.44 | 81.23 | 12.33 | | |
| 338 | steam | continuous centrifuge | unbleached | bale | 166 | −1 | 220 | 144 | 5.2 | 83.33 | 11.47 | 50 | 5.1 |
| 327 | No steam | continuous centrifuge | unbleached | bale | 272 | −2 | 220 | 125 | 10.8 | 75.67 | 13.53 | | |
| 339 | steam | continuous centrifuge | unbleached | bale | 272 | −1 | 220 | 120 | 6.92 | 80.14 | 12.95 | 50 | 5.1 |
| 328 | No steam | continuous centrifuge | unbleached | bale | 218 | −2 | 270 | 172 | 7.19 | 81.89 | 10.92 | | |
| 340 | steam | continuous centrifuge | unbleached | bale | 218 | −1 | 270 | 163 | 4.93 | 82.67 | 12.4 | 50 | 5.1 |
| 329 | No steam | continuous centrifuge | unbleached | bale | 275 | −2 | 270 | 149 | 9.93 | 77.4 | 12.67 | | |
| 341 | steam | continuous centrifuge | unbleached | bale | 275 | 0 | 270 | 141 | 8.98 | 80.12 | 10.9 | 50 | 5.1 |

Example 3

Example 2 was repeated on pulp produced from Southern pine. This pulp had an average fiber length of 2.3 mm to 2.4 mm. The pulp was never dried. The results of several lines are set forth in table 3 below.

TABLE 3

| Line Item | Special | Dewatering | Bleach | Status | Feed rate g/min (OD) | Null | Inlet Temp °C. | Outlet Temp °C. | Knots % | Accepts % | Fines % | Steam psi | steam line orifice mm |
|---|---|---|---|---|---|---|---|---|---|---|---|---|---|
| 357 | steam | screwpress | bleached | never-dried |  | -1.5 | 150 | 94 | 4.13 | 78.6 | 17.27 | 60 | 5.1 |
| 345 | No steam | screwpress | bleached | never-dried | 107 | -4 | 150 | 99 | 5.73 | 77.87 | 16.4 |  |  |
| 358 | steam | screwpress | bleached | never-dried | 148 | -1 | 170 | 98 | 5.73 | 77.2 | 17.07 | 60 | 5.1 |
| 346 | No steam | screwpress | bleached | never-dried | 148 | -3 | 170 | 108 | 6.6 | 77.87 | 15.53 |  |  |
| 359 | steam | screwpress | bleached | never-dried | 49 | -1 | 200 | 150 | 1.87 | 82.07 | 16.07 | 60 | 5.1 |
| 347 | No steam | screwpress | bleached | never-dried | 49 | -4 | 200 | 161 | 3.07 | 81.07 | 15.87 |  |  |
| 360 | steam | screwpress | bleached | never-dried | 104 | -1 | 200 | 129 | 4.73 | 78.07 | 17.2 | 60 | 5.1 |
| 348 | No steam | screwpress | bleached | never-dried | 104 | -3 | 200 | 143 | 3.33 | 81.27 | 15.4 |  |  |
| 361 | steam | screwpress | bleached | never-dried | 165 | -1 | 200 | 104 | 6 | 75.13 | 18.87 | 60 | 5.1 |
| 349 | No steam | screwpress | bleached | never-dried | 165 | -2 | 200 | 121 | 7 | 77.87 | 15.13 |  |  |
| 362 | steam | screwpress | bleached | never-dried | 62 | -0.5 | 220 | 157 | 2.47 | 81.13 | 16.4 | 60 | 5.1 |
| 350 | No steam | screwpress | bleached | never-dried | 62 | -2.5 | 220 | 174 | 3.13 | 81.4 | 15.47 |  |  |
| 363 | steam | screwpress | bleached | never-dried | 128 | 0 | 220 | 136 | 3.6 | 78 | 18.4 | 60 | 5.1 |
| 351 | No steam | screwpress | bleached | never-dried | 128 | -1 | 220 | 150 | 5.33 | 80.67 | 14 |  |  |
| 364 | steam | screwpress | bleached | never-dried | 194 | 0 | 220 | 108 | 9.53 | 71.8 | 18.67 | 60 | 5.1 |
| 352 | No steam | screwpress | bleached | never-dried | 194 | -2 | 220 | 120 | 5.13 | 78.13 | 16.73 |  |  |
| 365 | steam | screwpress | bleached | never-dried | 144 | -1 | 270 | 160 | 5.13 | 76.07 | 18.8 | 60 | 5.1 |
| 353 | No steam | screwpress | bleached | never-dried | 144 | -3 | 270 | 177 | 6.8 | 75.87 | 17.33 |  |  |
| 366 | steam | screwpress | bleached | never-dried | 187 | -1 | 270 | 141 | 4.67 | 78.07 | 17.27 | 60 | 5.1 |
| 354 | No steam | screwpress | bleached | never-dried | 187 | -3 | 270 | 153 | 5.8 | 77.4 | 16.8 |  |  |
| 355 | No steam | screwpress | bleached | never-dried | 260 | -3 | 270 | 120 | 7.8 | 75.2 | 17 |  |  |
| 367 | steam | screwpress | bleached | never-dried | 260 | -1 | 270 | 108 | 8.2 | 73.67 | 18.13 | 60 | 5.1 |
| 392 | steam | Continuous centrifuge | bleached | never-dried | 225 | -1 | 205 | 108 | 12.73 | 67.33 | 19.93 | 60 | 5.1 |
| 394 | No steam | Continuous centrifuge | bleached | never-dried | 231 | -1 | 205 | 117 | 29.4 | 54.73 | 15.87 |  |  |

As can be seen by reviewing the date set forth in Tables 1, 2, and 3, significant reductions in knots were achieved when steam was injected especially on the longer Douglas fir and Southern Pine pulp. Mixed results achieved with the shorter fiber pulps. However, the results are within a range of statistical error for the tests for sonic knots and therefore it may be concluded that at least some reduction of knots is achieved when steam is injected into the jet drier even with shorter fiber pulps.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process for producing singulated pulp fibers comprising:
   introducing a wet pulp, steam, and air into a jet drier that recirculates said pulp in a loop;
   drying said pulp in said jet drier to form singulated pulp fibers; and
   removing said pulp from said jet drier and separating said pulp fibers from said air.

2. The process of claim 1 wherein said steam is injected tangentially into said loop in said jet drier.

3. The process of claim 2 wherein said steam is injected into said drier surrounded by an air stream being injected into said drier.

4. The process of claim 1 wherein said steam is injected into said drier at a pressure of from 20 psig to 60 psig.

5. A process for producing singulated pulp fibers comprising:
   introducing a wet pulp, steam, and air into a jet drier, said steam being injected through an orifice having a diameter from about 1.5 mm to about 6.5 mm, said steam being injected into said drier at a pressure of from 20 psig to 60 Psig;
   drying said pulp in said jet drier to form singulated pulp fibers; and
   removing said pulp from said jet drier and separating said pulp fibers from said air.

6. The process of claim 5 wherein said steam is injected through an orifice of about 6.35 mm in diameter at a pressure of 60 psig.

7. A process for producing singulated pulp fibers comprising:
   introducing a wet pulp, steam, and air into a jet drier;
   drying said pulp in said jet drier to form singulated pulp fibers, said fibers having a length greater than about 2 mm; and
   removing said pulp from said jet drier and separating said pulp fibers from said air.

8. The process of claim 7 wherein said fibers have a length of from 2.3 mm to 2.5 mm.

9. A pulp product produced by the process of any one of claims 5 through 8.

10. A pulp product produced by the process of any one of claims 1 through 4.

* * * * *

UNITED STATES PATENT AND TRADEMARK OFFICE
CERTIFICATE OF CORRECTION

PATENT NO. : 6,769,199 B2
DATED : August 3, 2004
INVENTOR(S) : Vrbanac et al.

It is certified that error appears in the above-identified patent and that said Letters Patent is hereby corrected as shown below:

Column 22,
Line 5, "introducing a wet pulp, steam, and air into a let drier" should read
-- introducing a wet pulp, steam, and air into a jet drier --.

Signed and Sealed this

Sixth Day of December, 2005

JON W. DUDAS
*Director of the United States Patent and Trademark Office*